United States Patent [19]

Rein et al.

[11] Patent Number: 5,390,206

[45] Date of Patent: Feb. 14, 1995

[54] WIRELESS COMMUNICATION SYSTEM FOR AIR DISTRIBUTION SYSTEM

[75] Inventors: Alan D. Rein, Shoreview, Minn.; David M. Foye, La Crosse, Wis.

[73] Assignee: American Standard Inc., Piscataway, N.J.

[21] Appl. No.: 770,055

[22] Filed: Oct. 1, 1991

[51] Int. Cl.$^6$ .................... H04L 27/10; F24F 3/00

[52] U.S. Cl. .................... 375/1; 236/49.3; 236/51

[58] Field of Search ........... 375/1; 236/49.3, 51; 165/22

[56] References Cited

U.S. PATENT DOCUMENTS

| | | | |
|---|---|---|---|
| Re. 33,875 | 4/1992 | Tsuchiya | 375/1 |
| 3,605,877 | 9/1971 | Isaacs et al. | 165/26 |
| 4,028,688 | 6/1977 | Goleman | 340/227.1 |
| 4,132,355 | 1/1979 | Cleary et al. | 236/47 |
| 4,174,517 | 11/1979 | Mandel | 340/310 |
| 4,278,841 | 7/1981 | Regennitter et al. | 179/5 |
| 4,315,249 | 2/1982 | Apple et al. | 340/825.52 |
| 4,336,902 | 6/1982 | Neal | 236/46 |
| 4,341,345 | 7/1982 | Hammer et al. | 236/46 |
| 4,355,760 | 10/1982 | Ruby | 236/47 |
| 4,362,270 | 12/1982 | Cleary et al. | 236/46 |
| 4,389,577 | 6/1983 | Anderson et al. | 307/39 |
| 4,391,913 | 7/1983 | Keldmann | 236/36 |
| 4,432,210 | 2/1984 | Saito | 62/126 |
| 4,433,719 | 2/1984 | Cherry et al. | 165/26 |
| 4,479,604 | 10/1984 | Didner | 236/49 |
| 4,482,785 | 11/1984 | Finnegan et al. | 179/5 |
| 4,585,164 | 4/1986 | Butkovich et al. | 236/51 |
| 4,616,325 | 10/1986 | Heckenbach et al. | 364/505 |
| 4,630,221 | 12/1986 | Heckenbach et al. | 364/505 |
| 4,631,675 | 12/1986 | Jacobsen et al. | 364/400 |
| 4,673,127 | 6/1987 | Grant | 236/51 |
| 4,691,326 | 9/1987 | Tsuchiya | 375/1 |
| 4,703,325 | 10/1987 | Chamberlin et al. | 340/825.17 |
| 4,704,607 | 11/1987 | Teather et al. | 340/825.07 |
| 4,729,293 | 3/1988 | Tsunoda et al. | 98/40.24 |
| 4,734,871 | 3/1988 | Tsunoda et al. | 364/557 |
| 4,784,319 | 11/1988 | Kaiser | 236/46 |
| 4,795,089 | 1/1989 | Tezuka et al. | 236/49 |
| 4,811,195 | 3/1989 | Evans | 364/133 |
| 4,818,970 | 4/1989 | Natale et al. | 340/539 |
| 4,824,012 | 4/1989 | Tate | 236/49.5 |
| 4,860,950 | 8/1989 | Reeser et al. | 236/51 |
| 4,864,588 | 9/1989 | Simpson et al. | 375/1 |
| 4,866,732 | 9/1989 | Carey et al. | 375/1 |
| 4,866,733 | 9/1989 | Morishita | 375/1 |
| 4,948,045 | 8/1990 | Romano | 236/51 |
| 4,965,759 | 10/1990 | Uchida et al. | 375/1 |
| 4,969,508 | 11/1990 | Tate et al. | 165/22 |
| 4,975,926 | 12/1990 | Knapp | 375/1 |
| 4,977,577 | 12/1990 | Arthur et al. | 375/1 |
| 4,998,024 | 3/1991 | Kirk et al. | 307/40 |
| 5,004,999 | 4/1991 | Hartmann et al. | 340/539 |
| 5,008,662 | 4/1991 | Tokizane et al. | 340/825 |
| 5,018,165 | 5/1991 | Sohner et al. | 375/1 |
| 5,083,266 | 1/1992 | Watanabe | 395/275 |
| 5,104,037 | 4/1992 | Karg et al. | 236/46 |
| 5,109,222 | 4/1992 | Welty | 340/825 |
| 5,120,997 | 6/1992 | Cantwell | 375/1 |
| 5,128,855 | 7/1992 | Hilber et al. | 364/132 |
| 5,155,469 | 10/1992 | Hartmann et al. | 340/539 |
| 5,224,648 | 7/1993 | Simon, deceased et al. | 375/1 |
| 5,341,988 | 8/1994 | Rein et al. | 236/51 |

FOREIGN PATENT DOCUMENTS

| | | |
|---|---|---|
| 1187966 | 5/1985 | Canada . |
| 0361585 | 4/1990 | European Pat. Off. . |
| 2654240A1 | 11/1989 | France . |
| 3035680A1 | 4/1982 | Germany . |
| 58-080703 | 5/1983 | Japan . |
| 1269850 | 10/1989 | Japan . |
| 3164646 | 7/1991 | Japan . |
| 2140182A | 11/1984 | United Kingdom . |
| 2198264A | 6/1988 | United Kingdom . |

Primary Examiner—Salvatore Cangialosi
Attorney, Agent, or Firm—William J. Beres; William O'Driscoll; Peter D. Ferguson

[57] ABSTRACT

A hierarchical control system including a central receiver; a first communications medium operably connecting the central receiver to at least one controller; and a controller operably connected to the central receiver by the first communications medium. The system also includes a sensor for sensing conditions; a second communication medium; and a transmitter for transmitting the sensed conditions from the sensor to the central receiver via the second communications medium. The central receiver also includes receiver for receiving transmissions on the second communications medium and a transmitter for retransmitting the transmissions on the first communications medium.

43 Claims, 16 Drawing Sheets

| | |
|---|---|
| MESSAGE TYPE | 86T |
| ZONE SENSOR | 86A |
| AIR TEMPERATURE | 86B |
| SET POINT, HEATING | 86C |
| SET POINT, COOLING | 86D |
| MODE (HEAT, COOL) | 86E |
| BATTERY STATUS | 86F |
| TIMED OVERRIDE | 86G |

| | |
|---|---|
| MESSAGE TYPE | 100T |
| PERSONAL COMFORT SENSOR | 100A |
| AIR TEMPERATURE | 100B |
| AIR FLOW | 100C |
| AIR QUALITY | 100D |
| COMFORT INDICATOR TOO WARM TOO COLD | 100E |
| BATTERY STATUS | 100F |
| TIMED OVERRIDE | 100G |
| LIGHTING COMFORT LEVEL | 100H |
| GENERIC SENSOR INPUT | 100I |

| 182T | MESSAGE TYPE |
|---|---|
| 190 | ZONE SENSOR CODE |
| 192 | AIR TEMPERATURE |
| 194 | SETPOINT (HEAT) |
| 196 | SETPOINT (COOL) |
| 198 | MODE (HEAT COOL) |
| 200 | BATTERY STATUS |
| 202 | TIMED OVERRIDE |
| 204 | SERVICE OR SETUP COMMONDS |
| 184T | MESSAGE TYPE |
| 206 | PCS CODE # |
| 208 | AIR TEMPERATURE |
| 210 | AIRFLOW |
| 212 | AIR QUALITY |
| 213 | LIGHTING COMFORT |
| 214 | COMFORT INDICATOR (WARM/COLD) |
| 216 | BATTERY STATUS |
| 218 | TIMED OVERRIDE |
| 186T | MESSAGE TYPE |
| 220 | PCS CODE # |
| 222 | AIR TEMPERATURE |
| 224 | AIR FLOW |
| 226 | AIR QUALITY |
| 227 | LIGHTING COMFORT |
| 228 | COMFORT INDICATOR (WARM/COLD) |
| 230 | BATTERY STATUS |
| 232 | TIMED OVERRIDE |

FIG. 13

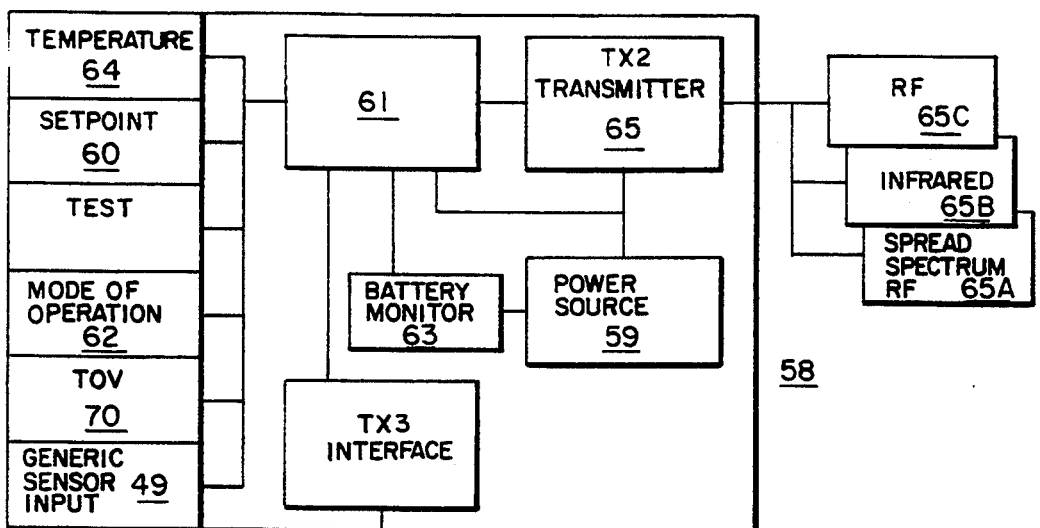
FIG. 21
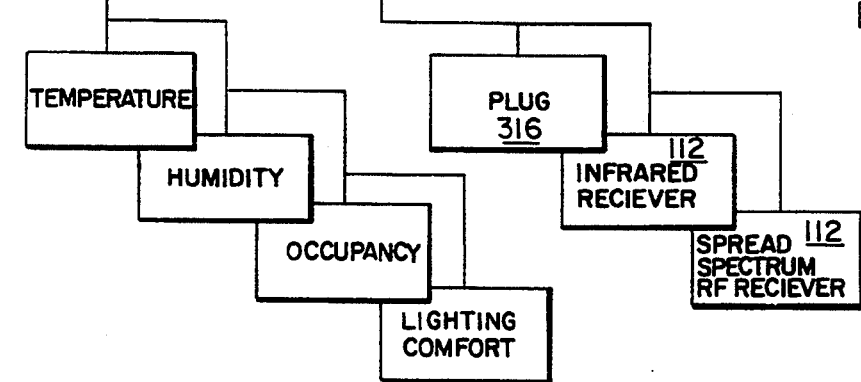
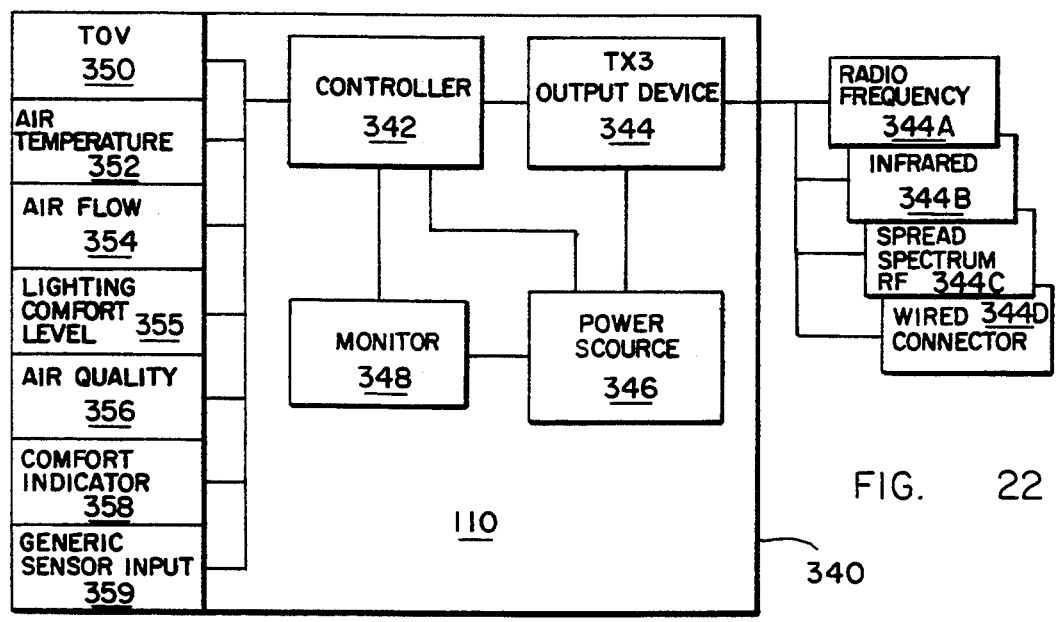
FIG. 22

WIRELESS COMMUNICATION SYSTEM FOR AIR DISTRIBUTION SYSTEM

BACKGROUND OF THE INVENTION

The present invention is directed to an air distribution system for an air conditioning system, and more particularly, to a wireless communication system between the air distribution controllers and the zone temperature sensors in the zone to be controlled.

Typical air handling systems rely on a physical connection between each zone sensor and each air handling unit controller. This physical connection is difficult, time consuming, and expensive to install because it is generally located within the support walls and ceiling of the structure whose air is to be conditioned. Its location within the structure makes the physical connection difficult to maintain, difficult to upgrade, and difficult to retrofit to an existing installation. In fact, the installation costs for installing the physical connection and the zone sensor is typically triple or quadruple the cost of the zone sensor and the physical connection.

Additionally, the location of the physical connection within a wall makes it extremely difficult to change the physical connection in response to an advance in technology. Furthermore, the controller for the air handling unit of the air distribution system is thereafter dependent on and limited to the type of physical connection, as well as to the particular zone sensor the controller is connected to and the particular location of the zone sensor.

SUMMARY OF THE INVENTION

It is an object, feature and advantage of the present invention to solve the problems of prior art communication schemes for air distribution systems.

It is an object, feature and advantage of the present invention to eliminate the physical connection between the zone sensors and the controller of the air handler or air handling terminal unit of an air distribution system.

It is an object, feature and advantage of the present invention to provide a zone sensor with reduced installation costs.

It is an object, feature and advantage of the present invention to provide a zone sensor which can be easily relocated in response to changes in the air distribution system.

It is an object, feature and advantage of the present invention to provide a zone sensor which can be easily relocated in response to the environment being conditioned.

It is an object, feature and advantage of the present invention to provide a wireless communication system for an air distribution system which can be easily retrofit to existing installations.

It is an object, feature and advantage of the present invention to provide a wireless communication system for an air distribution system which can be easily upgraded in response to changing technology.

It is an object, feature and advantage of the present invention to provide a wireless communication system for an air distribution system which allows a controller for an air distribution system to operate independently of a particular zone sensor.

It is an object, feature and advantage of the present invention to operate an air distribution system using a designated master setpoint responsive to a plurality of zone sensors.

It is an object, feature and advantage of the present invention to provide an air distribution system including a master setpoint representative of a plurality of zone sensor setpoints.

It is an object, feature and advantage of the present invention to provide a wireless communication system for an air distribution system which allows a controller of the air distribution system to operate independently of the location of a particular zone sensor.

It is an object, feature and advantage of the present invention to provide the controller of an air handling unit with alternate zone sensors for use when the primary zone sensor fails in any way.

It is an object, feature and advantage of the present invention to provide a wireless communication system which allows the controller of an air handling unit to operate using the inputs from a plurality of zone sensors.

It is an object, feature and advantage of the present invention to provide a wireless communication system for an air distribution system which allows a controller of the air distribution system to operate by averaging the input of a plurality of zone sensors.

It is an object, feature and advantage of the present invention to provide a wireless communication system for an air distribution system which allows the controller of an air distribution system to operate in conformity with the data from a majority of several predetermined zone sensors.

It is an object, feature and advantage of the present invention to provide a hierarchical wireless communication scheme for an air distribution system.

It is an object, feature and advantage of the present invention to provide a wireless communication system which will operate with existing air distribution controller communication networks.

It is an object, feature and advantage of the present invention to provide a hierarchical variable air volume communication system.

It is an object, feature and advantage of the present invention to provide a default sensor arrangement for the controller of an air distribution system.

It is an object, feature and advantage of the present invention to provide a wireless communication system for an air distribution system having at least two different communications medium.

It is an object, feature and advantage of the present invention to provide a communication system for an air distribution having at least three different communications media.

It is an object, feature and advantage of the present invention to allow the user of an air distribution system to inform the air distribution system of the user's personal comfort.

It is an object, feature and advantage of the present invention to allow the controller of an air distribution system to respond to a user's personal comfort requirements.

It is an object, feature and advantage of the present invention to provide a wireless communication system for an air distribution system with great range.

It is an object, feature and advantage of the present invention to provide a one-way wireless communication system for an air distribution system.

It is an object, feature and advantage of the present invention to provide a wireless communication system for an air distribution system using radio frequency as a communications medium.

It is an object, feature and advantage of the present invention to provide a wireless communication system for an air distribution system using spread spectrum radio frequency transmissions as a communications medium.

It is an object, feature and advantage of the present invention to provide a two tier wireless communication system for an air distribution system using a hard wired communications bus as the first tier, and a wireless communication scheme as the second tier.

It is an object, feature and advantage of the present invention to provide a three tier communications system for an air distribution system using a hard wired bus as the first tier, a wireless communication system as the second tier, and an infrared communication system as a third tier.

It is an object, feature and advantage of the present invention to provide a central receiver on a hard wired communications bus which receives wireless transmissions from the zone sensors.

It is an object, feature and advantage of the present invention to provide a wireless communication system including redundant receivers.

It is an object, feature and advantage of the present invention to provide a generic sensor input.

It is an object, feature and advantage of the present invention to provide a wireless communications system for an air distribution system which facilitates air balancing.

It is a further object, feature and advantage of the present invention to provide a wireless communication system including redundant receivers connected by a hard wired communications bus.

It is an object, feature and advantage of the present invention to provide a wireless communication system including a backup receiver to ensure the receipt of wireless transmissions from zone sensors and the like.

It is an object, feature and advantage of the present invention to provide a setup tool for programming components of a wireless communications system.

It is an object, feature and advantage of the present invention to provide a setup tool which programs a wireless communications systems using wireless communications.

It is an object, feature and advantage of the present invention to provide a setup tool which programs a wireless communication system by means of a physical connection to any one of a plurality of the components of the wireless communications system.

It is an object, feature and advantage of the present invention to provide a setup tool in a one-way wireless communications systems which uses an audible signal or signals as a form of acknowledgement to the user of the setup tool.

It is an object, feature and advantage of the present invention to provide a wireless communication system whose receivers and transmitters are substantially independent of location.

It is an object, feature and advantage of the present invention to minimize the number of receivers required by a wireless communication system.

It is an object, feature and advantage of the present invention to reduce the component costs of a wireless communication system by reducing the number of receivers needed by the wireless communication system.

It is an object, feature and advantage of the present invention to allow an individual to indicate lighting level comfort.

It is an object, feature and advantage of the present invention to provide a building automation and control system which is responsive to the comfort needs of an occupant on an individual basis.

The present invention provides a hierarchical control system including a first central receiver, a first communications medium operably connecting the first central receiver to at least one controller and a controller operably connected to the first central receiver by the first communications medium. The system also includes a first sensor for sensing conditions, a second communication medium, and a transmitter for transmitting the sensed conditions from the first sensing means to the first central receiver via the second communications medium. The first central receiver includes a receiver for receiving transmissions on the second communications medium and a transmitter for retransmitting the transmissions on the first communications medium.

The present invention also provides a system for transferring information from a sensor to a controller. The system includes a first communications medium, a second wireless communications medium, a controller operably connected to the first communications medium and a receiver operably connected to the first communications medium. The receiver includes a receiver for receiving communications on the second communications medium and a transmitter for retransmitting communications from the second communications medium on the first communications medium. The system includes a first sensor for sensing conditions, wherein the first sensor includes a transmitter for transmitting the sensed conditions on the second communications medium. The controller is responsive to the first sensor by means of the first and second communications medium.

The present invention additionally provides a building automation system comprising: means for conditioning air; and means for distributing conditioned air from said air conditioning means. The distributing means includes a first communications medium, and a plurality of controllers operably connected to the first communications medium. At least some of the plurality of controllers each includes means for controlling the air distribution. The building automation system also includes a second wireless communications medium; at least one central receiver operably connected to the first communications medium. The central receiver includes a receiver for receiving transmissions on the second communications medium and a transmitter for retransmitting the communications from the second communications medium onto the first communications medium. The building automation system also includes a plurality of sensors, each of which includes a sensor for sensing environmental conditions and a transmitter for transmitting data indicative of the sensed conditions on the second communications medium. At least some of the plurality of controllers then controls the distribution of air in accordance with the transmitted data.

The present invention further provides a method of controlling an environment. The method comprises the steps of: determining, with at least a first sensor, the environmental conditions in each of a plurality of zones; transmitting signals indicative of the environmental conditions from each of said plurality of zones to a central receiver by means of a second communications medium; receiving the environmental conditions at the central receiver from the second communications medium; retransmitting the environmental conditions from the central receiver onto a first communications medium; receiving in each of a plurality of controllers the retransmitted environmental conditions on the first communications medium; and controlling the environment of a particular zone in accordance with a predetermined portion of the environmental conditions.

The present invention also provides a setup tool for programming a building automation system having a central receiver operably connected to a plurality of controllers by a first communications medium. The central receiver is operable to receive transmissions on a second communications medium. The setup tool comprises: means for constructing program instructions for one of the plurality of controllers; and a transmitter, operably connected to the construction means, for transmitting the programmed instructions to the central receiver by means of second communications medium.

The present invention also provides a zone sensor for providing information regarding an environment to be conditioned to a controller. The zone sensor comprises: a housing; a transmitter associated with the housing, for transmitting wireless communications on a second communications medium; a sensor, associated with the housing, for monitoring environmental conditions such as temperature; and means, associated with the housing and operably connected with the transmitting means and the monitoring means, for initiating wireless transmissions of environmental conditions and instructions upon a timed or change of state basis.

The present invention additionally provides a controller which is operable independent of a particular zone sensor. The controller comprises: a housing; means, associated with the housing, for actuating a device to be controlled; means, associated with the housing, for programming the controller with an indication of a plurality of available zone sensors; means, associated with the housing, for selecting a control algorithm from a plurality of control algorithms; and means, associated with the housing, for operating the controller in accordance with the selected control algorithm and the indicated zone sensors.

The present invention further provides a sensor including: a housing; a controller associated with the housing; and a temperature sensor associated with the housing and operatively connected to the controller. The sensor also includes a power supply operatively connected with the controller and associated with the housing; and a wireless transmitter associated with the housing and operatively connected with the controller. The sensor also includes means, associated with the controller and the power supply, for entering a dormant state of low power consumption, and means, associated with the controller and power supply, for automatically awakening from the dormant state.

The present invention further provides a method of balancing an air distribution system. The method comprises the steps of: (A) providing a plurality of devices, each capable of controlling the airflow through ducts; (B) determining an optimum or balanced airflow setpoint for each of the ducts; (C) identifying the optimum or balanced airflow setpoint for each of the ducts to the respective controlling device; (D) distributing air through the air distribution system; (E) measuring airflow in the ducts; (F) reporting measured airflow to a respective controlling device; (G) initiating, at substantially the same time, a comparison by each of the controlling devices of measured airflow and optimum or balanced airflow; (H) controlling the airflow in the various ducts to minimize the difference between measured airflow and optimum or balanced airflow setpoint; (I) repeating steps e, f, g and h until the air distribution system is balanced; and (J) customizing the air balancing system in response to indications of personal discomfort or environment changing conditions.

The present invention also provides a method of controlling an HVAC system. The method comprises the steps of: distributing conditioned air to a plurality of zones; controlling the flow of conditioned air to each of the plurality of zones with a plurality of controllers; operably linking the controllers with a first communications medium; monitoring the effect of the conditioned air in each of the plurality of zones with at least one sensor; transmitting the monitored effects on a second wireless communications medium; receiving the transmissions on the second communications medium in a central receiver; retransmitting the monitored effects from the central receiver on the first communications medium; and receiving the monitored effects from the first communications medium in the plurality of controllers.

The present invention additionally provides a hierarchical control system including a central receiver; a first communications medium operably connecting the central receiver to at least one controller; and a controller operably connected to the central receiver by the first communications medium. The system includes a first sensor for sensing conditions; a second communication medium and a transmitter for transmitting the sensed conditions from the first sensor to the central receiver via the second communications medium. The central receiver includes a receiver for receiving transmissions on the second communications medium and a transmitter for retransmitting the transmissions on the first communications medium. The system also includes a third communications medium; a second sensor for sensing conditions. The second sensor includes a transmitter for transmitting the sensed conditions on the third communications medium. The first sensor includes a receiver for receiving sensed conditions transmitted on the third communications medium and means for retransmitting transmissions from the third communications medium on the second transmissions medium. The system also includes a generic sensor input and means for identifying and processing generic sensor data. Additionally, the system includes a setup tool for providing programming instructions for the controller, and a transmitter for transmitting the programming instructions on the second or third communications medium.

The present invention also provides a method of providing personal comfort control in an air conditioning system having a plurality of zones where each zone has at least one controller controlling the environment of the zone, the method comprises the steps of: sensing at least one environmental condition in the zone; transmitting the sensed condition to the controller by wireless transmission; and controlling the environment of the zone in response to the sensed condition.

The present invention additionally provides a method of controlling the environment of a plurality of zones while responding to individual personal comfort requirements within each zone. The method comprises the steps of: repeatedly providing a zone controller with zone data and user comfort data by wireless transmission; controlling the environment of each zone in accordance with the zone data; and subsequently modifying at least a portion of the environment of a particular zone in accordance with user comfort information.

BRIEF DESCRIPTION OF THE DRAWINGS

FIG. 13 shows a zone data packet for one zone sensor and two personal comfort sensors.

FIG. 21 is a block diagram of the zone sensor of the present invention.

FIG. 22 is a block diagram of the personal comfort sensor of the present invention.

DETAILED DESCRIPTION OF THE DRAWINGS

Figure 1:
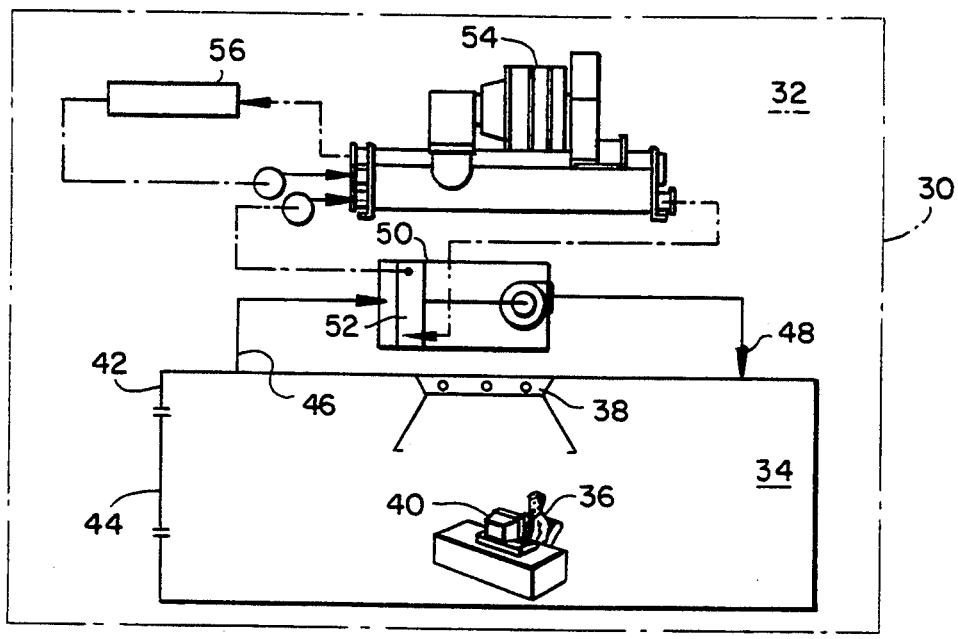
FIG. 1 shows a diagram of a typical air conditioning and distribution system.

FIG. 1 shows a typical building 30 having an air distribution system 32. In this building 30 heat flows to and from the building interior through a series of heat transfer operations.

During normal cooling operation, heat enters each zone 34 from internal sources such as people 36, lights 38 and equipment 40, and from external sources such as infiltration through walls 42, conduction through walls 42, and radiation through windows 44. Warm air is removed from each zone 34 by the return air stream 46 and is replaced by cool supply air from a terminal unit 48. At an air handler 50, warm return air rejects heat to cool water flowing within the heat exchange coil 52. The warm water exiting from the coil 52 rejects its heat to refrigerant within a water chiller 54 located elsewhere. The refrigerant in turn rejects heat to a condenser 56.

During normal heating operation, heat leaves each zone 34 and is replaced by warm supply air from the terminal unit 48. A heating element in the terminal unit 48 can supply the heat, or heat can be extracted at the air handler 50 from water flowing within the heat exchange coil 52.

The basic control objective in the zone 34 controlled by an air distribution system 32 is to add or subtract heat by means of the conditioned air supply so that the net amount of heat gained, lost, and stored within the zone 34 is balanced at a comfortable temperature. Conventional variations in this arrangement are contemplated such as, for example, (1) the elimination of the water chiller loop so that the return air itself is in heat exchange relationship with the refrigerant, or (2) the use of a cooling tower instead of the condenser 56.

First Embodiment

Figure 2:
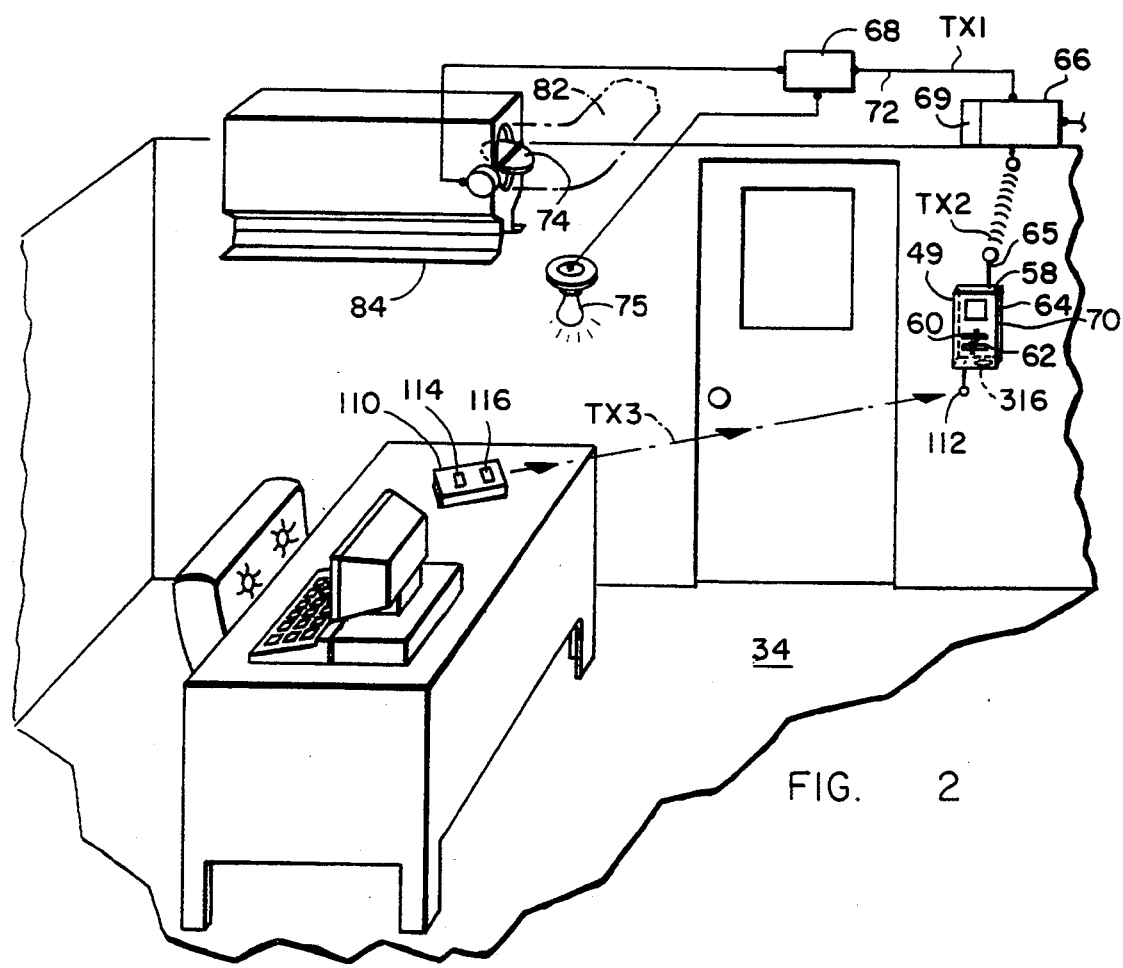
FIG. 2 shows a single zone of an air handling system incorporating the present invention.

FIG. 2 shows, from a user's perspective, a single zone 34 incorporating the present invention. The single zone 34 includes a zone sensor 58 having a microprocessor 61 and user selectable inputs for setpoint 60 and mode of operation 62 (i.e. heating or cooling) as well as a temperature sensor 64 which monitors air temperature. The zone sensor 58 is also shown in FIG. 21. The zone sensor 58 is usually located in a fixed position which is both easily accessible to the user, and representative of the temperature in the zone 34. As will subsequently be discussed, the zone sensor 58 may also include a generic sensor input 49.

It should be recognized that the zone sensor 58 is preferably powered by a power source 59 such as a battery, and therefore the zone sensor 58 either can be detachable from the representative location, or can be always portable and have no fixed position. The power source 59 can also be a wired connection to an AC power supply or can be a connection to other power sources such as pneumatic or solar. If a battery power source 59 is used, a battery level monitor 63 is also preferably included. Additionally, if a non-renewable power source such as a battery 59 is used, a hardware timer interrupt is also preferably included in the microprocessor of the zone sensor 58. The zone sensor 58 is then able to enter a dormant state, akin to sleep, where minimal power is used. Periodically (preferably on the order of a two second interval), the hardware timer interrupt activates the zone sensor 58, and the zone sensor 58 samples its environment by means of the available inputs 60, 62, 64, 49. If the elapsed time since the last transmission of data is less than 30 seconds, the zone sensor 58 then returns to its dormant state. If the elapsed time since the last transmission of data is greater than five minutes, a mandatory transmission of data to a central receiver 66 is made. If the elapsed time is greater than thirty seconds but less than five minutes, a transmission is made if any of the following criteria is met: (1) if the absolute value of the difference between the latest temperature and the temperature at the last transmission is greater than twice the temperature range resolution; (2) if the setpoint has changed 1° F. since the last transmission; or if a setup command from a setup tool 320 or a message from a personal comfort sensor 110 has been received. Other criteria are also contemplated. After sampling and after transmitting, the zone sensor 58 returns to the dormant state.

The zone sensor 58 has an objective to responsively communicate information and react to changes in zone conditions. To facilitate this, the zone sensor 58 includes a wireless transmitter 65. This wireless transmitter 65 is preferably a spread spectrum radio frequency transmitter 65A, but may also be an infrared transmitter 65B, narrow band radio frequency transmitter 65C, or an ultrasonic transmitter. At regular intervals or after a change of state or when required by a user to respond to a command, the zone sensor 58 uses the wireless transmitter 65 to transmit a wireless signal to a receiver portion 67 of a central receiver 66. The central receiver 66 preferably includes a conventional microprocessor data controller 362 and associated RAM and ROM memory 364.

Figure 23:
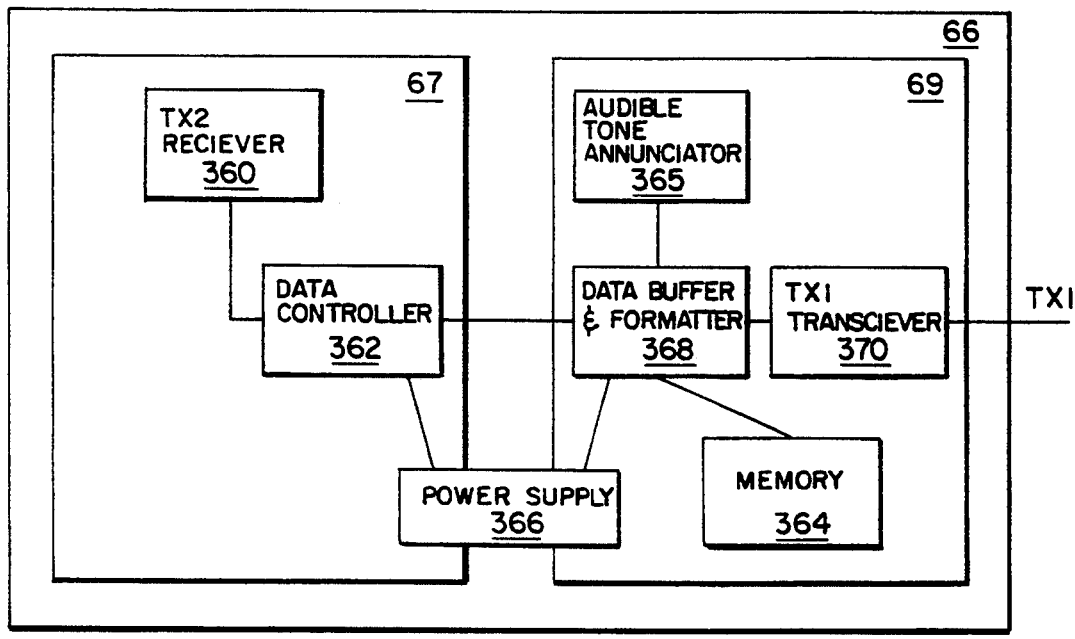
FIG. 23 is a block diagram of the central receiver of the present invention.

The central receiver 66 receives the wireless signals from each of a plurality of zone sensors 58 in its receiver portion 67, reformats those signals in a translator portion 69 of the central receiver 66, and retransmits those signals on a first communications medium TX1, for example, a hard wired communications bus 72 connecting the units of the air distribution system 32. The central receiver 66 is shown in FIG. 23 as including a receiver portion 67 and a translator portion 69. The receiver portion 67 includes a TX2 receiver 360 which receives transmissions on a second communications medium TX2; a data controller 362 such as a TMS 320C14 microcontroller to control the acquisition of transmission on the second communication medium TX2; and a power supply 366. The translator portion 69 includes a data buffer and formatter 368 such as a Mitsubishi M50747 microprocessor which receives data packets from the data controller 362 and reformats them, if necessary, in the format of the first communication medium TX1. A memory device 364 is provided to store such information as valid transactions and lists of valid message transmitters, while an audible tone annunciator 365 is included to provide audible acknowledgements of commands received on the second communications medium TX2. The reformatted messages are dispatched by a TX1 transceiver 370 connected to the first communications medium TX1. The transceiver 370 allows two way communication between the central receiver 66 and any device connected to the first communications medium TX1. This allows a building automation system 76 or the coordinating controller 102 of FIG. 7 to program or command the central receiver 66. Alternatively, the setup tool 320 of FIG. 19 can transmit program instructions or commands to the central receiver 66 over the second communications medium TX2.

Figures 6, 9, 10:
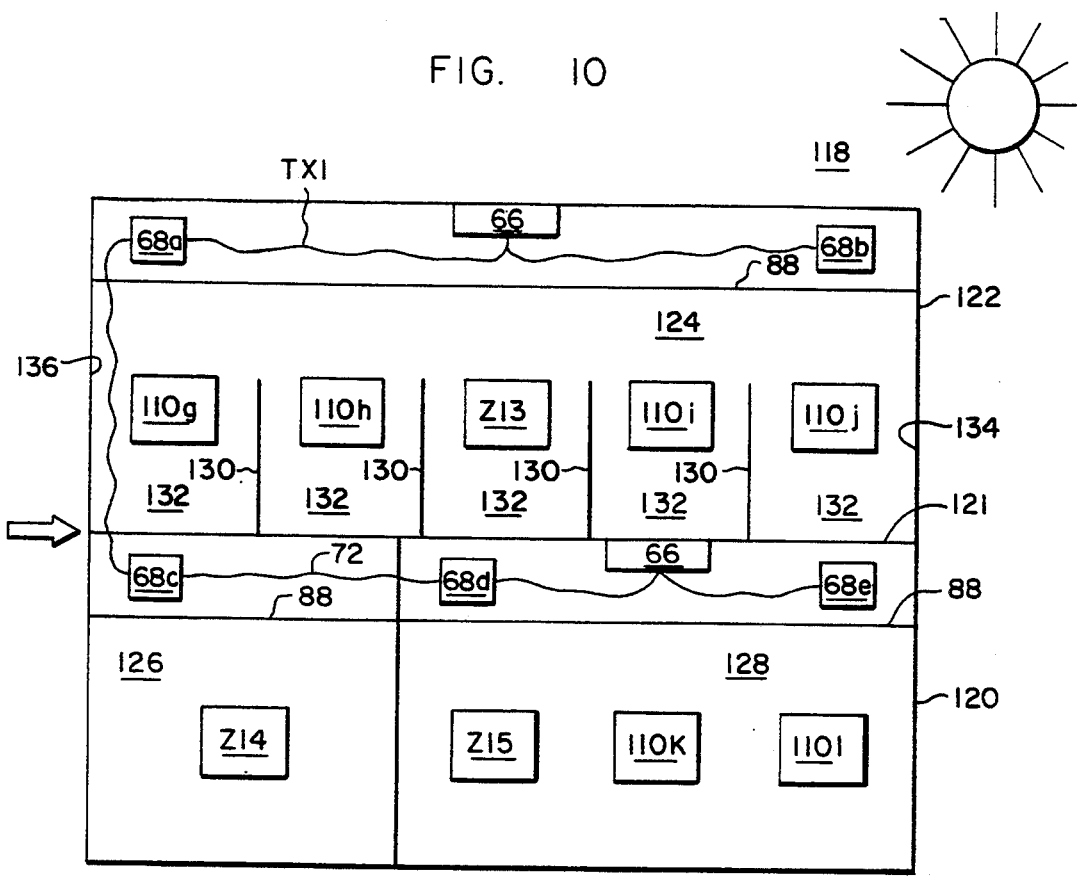
FIG. 6 is a table showing the data packet transmitted by a zone sensor.
FIG. 9 is a table showing the data packet transmitted by a personal comfort sensor.
FIG. 10 shows an example of the second preferred embodiment of the present invention.

FIG. 6 shows a data packet 86 included in the zone sensor's wireless transmission. This data packet 86 is preferably prefixed by a message type 86T and includes an indication of the zone sensor's identity 86A, the zone sensor's setpoint 86C, 86D, the zone sensor's mode of operation 86E, and the current zone temperature 86B. The zone sensor 58 can also transmit information from the battery level monitor 63 indicating the power level 86F of a battery 59 in the zone sensor 58, and an indication of whether a user has initiated timed override 86G.

During unoccupied zone periods such as late at night, timed override 86G allows a user, by touching a switch 70, to indicate to a controller 68 of the zone air handling system that the zone 34 should temporarily be treated as occupied rather than unoccupied. After the expiration of a predetermined time-out period, the controller 68 automatically returns the zone 34 to the unoccupied status. A more sophisticated version of timed override provides a multifunction way of allowing a user to drive the system and to enter information to the system. In this version the switch 70 acts as an on/off toggle to indicate occupancy or unoccupancy of a zone respectively. If an automatic time-out is required to return the zone to the unoccupied state, the period of time selected for automatic time-out is large, preferably several hours in length.

The timed override switch 70 in conjunction with the setpoint 86C or 86D can also be used in servicing the system. By first setting the setpoint 86C and 86D in an invalid state such as the extreme maximum or minimum, then touching the switch 70, the controller 68 can respectively be instructed to enter a permanent override state or to open its damper 74 to a maximum flow rate. A serviceman can then service the system in that particular state.

Although the controllers 68 are generally described herein as controlling the damper 74 of a terminal unit 48, the present invention is not intended to be limited by the controller's application. For instance, the controller 68 could control the operation of the air handler 50, or the water chiller 54 in response to data provided by the present invention. Additionally, the controller 68 can control other types of HVAC units (not shown) such as roof top air conditioning units, self-contained units, or packaged terminal air conditioners. The controller 68 can also control the operation of the zone lighting 38,75 to provide variable intensity lighting in response to user indications of lighting comfort levels, or in response to building management control strategies provided by the building automation system 76.

Figure 24:
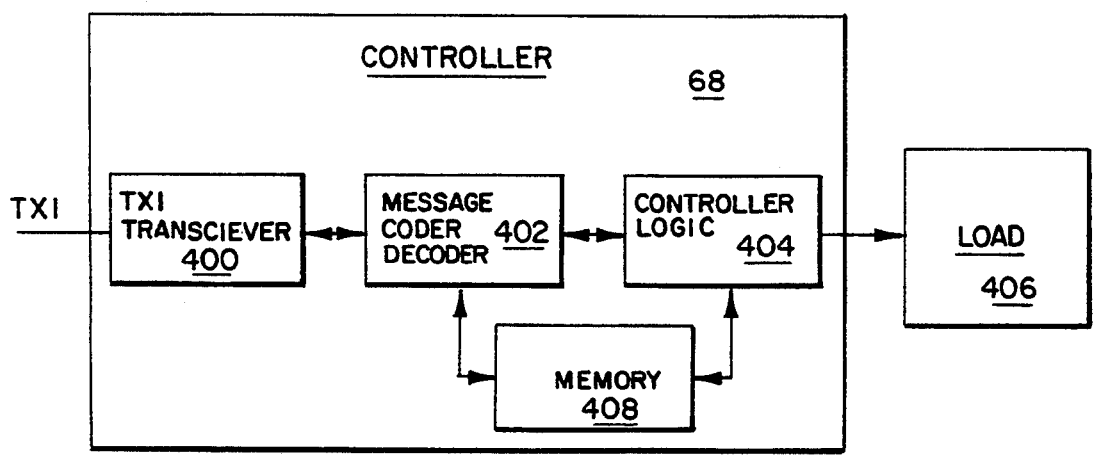
FIG. 24 is a block diagram of the controller of the present invention.

FIG. 24 shows a block diagram of a controller 68 including a TX1 transceiver 400 for receiving and transmitting messages on the first communications medium TX1. The transceiver 400 is connected to a message encoder/decoder 402 which encodes or decodes messages received from or to be transmitted on the first communications medium TX1. Decoded messages are supplied to a controller logic unit 404 which uses information from the messages in conjunction with control algorithms to control a load 406 such as a damper 74, a variable speed fan, a compressor, an air conditioning unit, a light or lighting bank 38,75 or other similar devices. A memory 408 is provided and connected both to the controller logic unit 404 and the message encoder/decoder 402 for storing data, instructions and algorithms.

Each controller 68 attached to the bus 72 has the identification signal 86A for the particular zone sensor 58 or zone sensors 58 located in the controller's zone 34 stored in the memory 408 of the controller 68. The controller 68 monitors transmissions on the bus 72 for signals emanating from that particular zone sensor 58 or zone sensor 58. Non-relevant data transmissions are received and discarded. When the controller 68 recognizes a data packet 86 from its designated zone sensor(s) 58, the controller 68 controls the position of a damper 74, or the speed of a variable speed fan (not shown), depending upon the mode of operation 86E, the setpoint 86C, 86D, and the temperature 86B provided by the zone sensor 58. Although the present invention is described in connection with a controller 68 modulating zone temperature by modulating damper position, other ways of modulating zone temperature are contemplated including the use of variable speed primary air, return air and/or discharge air fans or the use of a variable size orifice.

Figure 3:
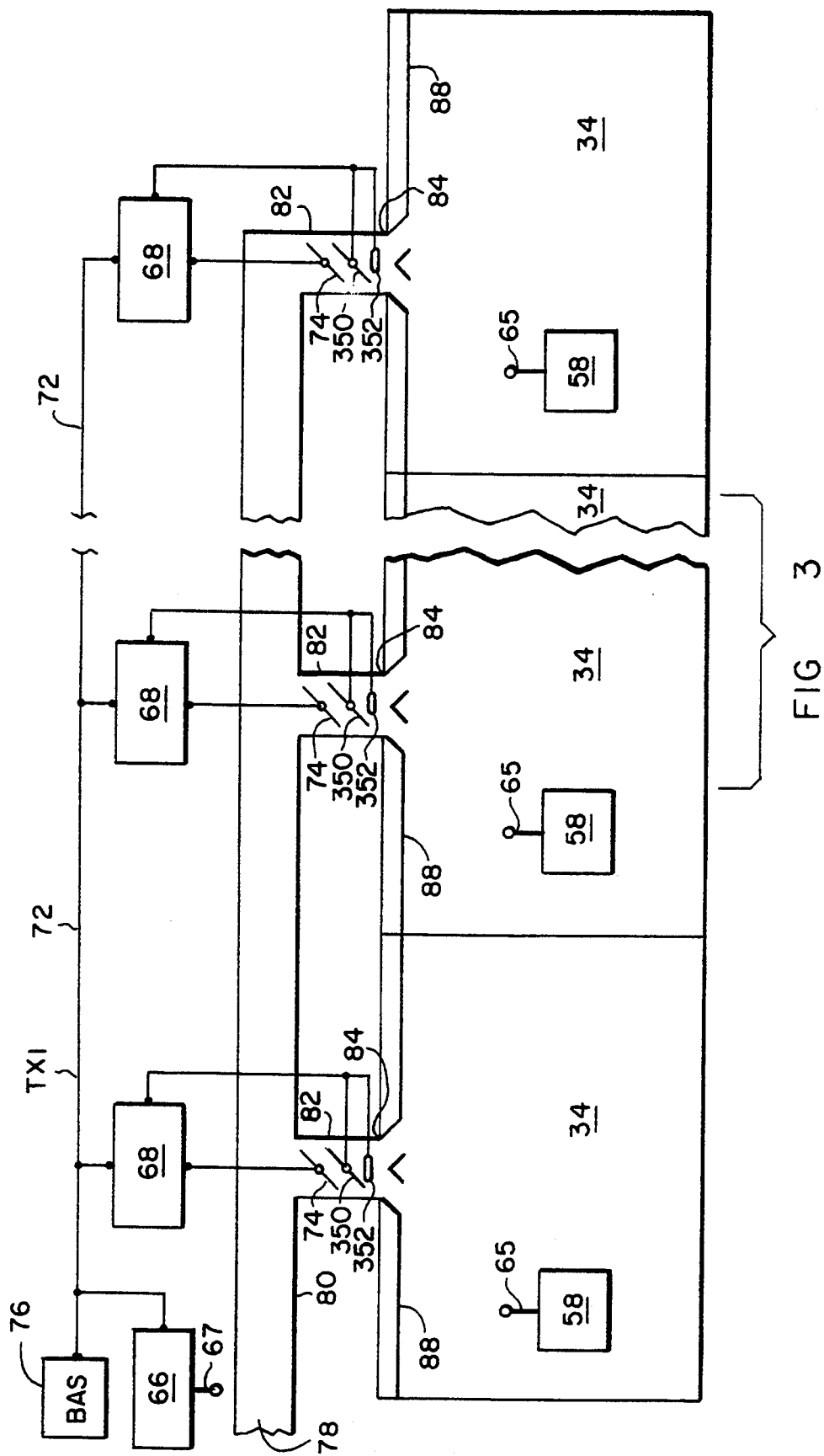
FIG. 3 shows a block diagram of the preferred embodiment of the present invention.

FIG. 3 shows a block diagram of the wireless communication system and the air distribution system of the present invention. A first communications medium TX1 such as the hard wired communications bus 72 links a plurality of air handling controllers 68 to each other, to the central receiver 66, and optionally to a building automation system 76. The building automation system 76 allows the controllers 68 and zones 34 to be centrally monitored and automatically coordinated. Each controller 68 can exchange information via the first communications medium TX1. This first communications medium TX1 is implemented as the communications bus 72, which in the preferred embodiment is a twisted pair wire communications link transferring data in a serial fashion. The first communications medium TX1 can also be implemented as a power line carrier or the like.

Additionally, each controller 68 can receive setpoints and other commands from the building automation system 76, and can transmit status and other information to the building automation system 76. Commands from the building automation system 76 can either be directed to a specific controller 68, or can be in the form of a general broadcast to all controllers 68. Such a general system broadcast might provide outside air temperature or might indicate that the power level of a particular zone sensor 58 has depleted, and that controllers 68 relying on information from that particular sensor should substitute a default sensor. In cases where it is not possible to substitute a default sensor because (1) a default sensor has not been designated, (2) the default sensor is known to be inoperative, (3) if the controller 68 is not connected to the bus 72, or (4) the controller is being used as a stand alone controller, the controller 68 operates using the last operating mode and setpoints with which the controller 68 has been provided.

Referring to FIGS. 2 and 3, a source 78 of supply air from an air handling unit 50 is provided by a supply air duct 80. A plurality of branch ducts 82 interconnect the supply air duct 80 to the plurality of zones 34 whose environment is to be controlled. Each branch duct 82 has a damper 74 or its equivalent controlled by the controller 68 of the particular zone 34 or zones 34 to which the branch duct 82 supplies conditioned air. Within each zone 34 is a zone sensor 58 which transmits information to the central receiver 66 using a second communication medium TX2.

The second communication medium TX2 is preferably spread spectrum radio frequency transmissions where the bandwidth of the transmitted signal is deliberately widened to improve the signal to noise ratio. The use of two distinct redundant transmissions on two distinct frequencies is also preferred to insure that a message is received at its destination even if one frequency is blocked. The use of spread spectrum radio frequency transmissions, as opposed to other types of transmissions media including conventional radio frequency transmissions, is preferred because spread spectrum radio frequency transmissions have greater range, and are far less susceptible to interference from building structures and electronic devices. In spread spectrum communications, a spreading algorithm is selected to spread the transmission over a much greater bandwidth than a conventional transmission bandwidth. Consequently, if the algorithm spreads the bandwidth of the transmission 100 times as wide as the conventional bandwidth, a source of interference which interferes with 50% of a conventional bandwidth's transmission will only interfere with 0.5% of the same transmission sent with the spreading algorithm. Additionally, multiple spreading algorithms can be selected so that simultaneous transmissions using different spreading algorithms will, at most, minimally interfere with each other. Spreading algorithms are described in *Spread Spectrum Systems,* Robert C. Dixon (2nd ed, 1984, John Wiley & Sons, Inc. New York, TK5102.5.D55, ISBN 0-471-88305-3) which is herein incorporated by reference. Although spread spectrum transmissions are preferred, the second communication medium TX2 can also be a conventional bandwidth radio frequency transmission, or in some limited circumstances the second communication medium TX2 can be an infrared or ultrasonic transmission.

As previously stated, the zone sensor 58 transmits a zone sensor data packet 86 containing an identification code 86A, a zone mode of operation 86E, a heating or cooling zone setpoint 86C, 86D for that particular mode of operation, and a zone air temperature 86B, as well as battery status 86F and timed override signals 86G. The central receiver 66 receives the transmissions from each of a plurality of zone sensors 58, checks to see if the transmission itself and the transmitting device are valid, formats each of the transmissions from the zone sensors 58 into a format usable on the first communications medium TX1 and retransmits the zone sensor data packets 86 onto the first communications medium TX1. Each of the plurality of controllers 68 monitors the first communications medium TX1 for zone sensor data packets 86 emanating from that particular controller's designated zone sensor 58 and controls a branch duct damper 74 in accordance with those signals.

Figure 4:
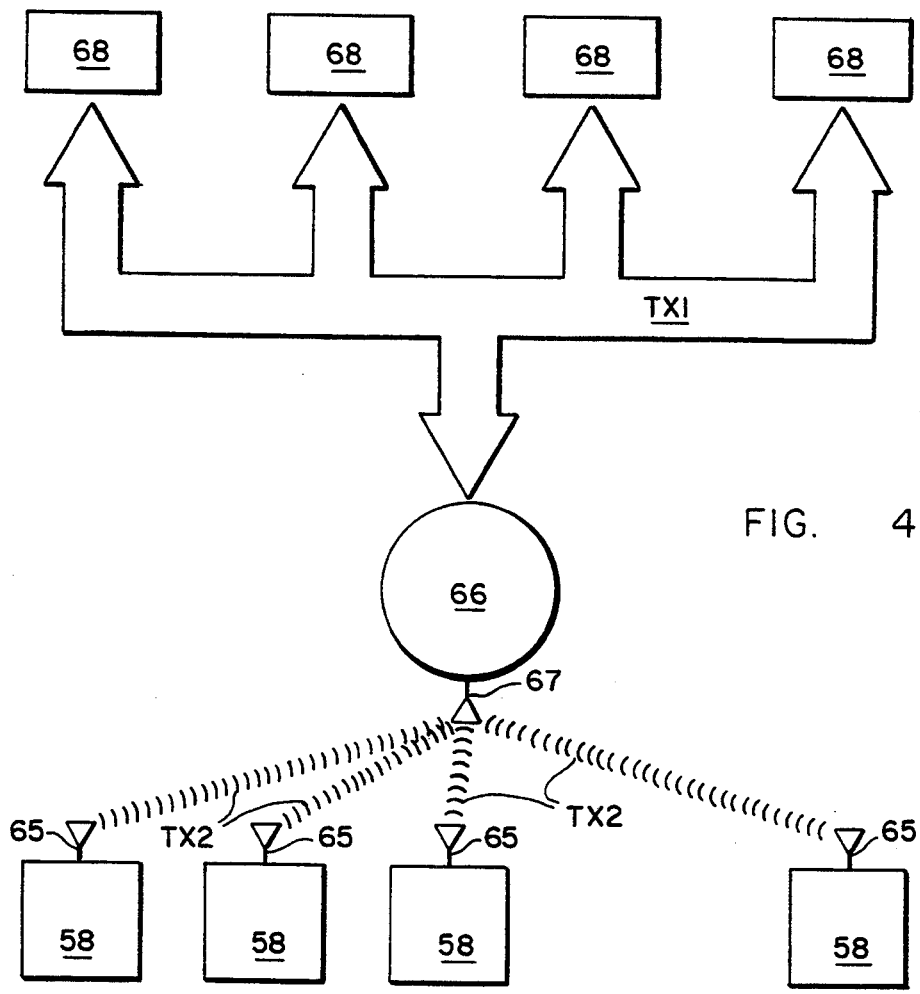
FIG. 4 shows a block diagram of the hierarchical communication system of the present invention.

FIG. 4 is a block diagram showing how the essentially hierarchical wireless communication system of the present invention operates. A plurality of air distribution controllers 68 are linked by the first communications medium TX1 to at least one central receiver 66 capable of receiving transmissions on the second communication medium TX2. This central receiver 66 receives wireless transmissions on the second communication medium TX2 from a plurality of zone sensors 58. These zone sensors 58 generally have a logical correspondence to the controllers 68 although several controllers 68 can rely on information from the same zone sensor 58, or alternatively several zone sensors 58 can provide information to the same controller 68. These alternatives will be subsequently described.

The central receiver 66 receives the transmissions on the second communication medium TX2, places the transmissions in the format of the first communications medium TX1, and retransmits the zone sensor information on the first communications medium TX1. The central receiver 66 also maintains an internal list of valid zone sensors 58 for use in verifying the validity of data packet transmissions. These internal lists are programmed by the building automation system 76 or the setup tool 320, and are an aid in reducing invalid or redundant transmissions on the first communications medium TX1. As previously stated, each controller 68 recognizes identification codes 86A for particular zone sensors 58, extracts the information accompanying the identification code 86A, and uses that information to modulate airflow in a branch duct 82 or in a zone air handling unit 84 such as an terminal air unit.

The zone 34 whose environment is to be controlled typically includes a zone sensor 58, and a drop ceiling 88. Above the drop ceiling 88 is a supply air duct 80 supplying conditioned air from an air conditioning unit, a branch duct 82 connecting the supply air duct 80 to a terminal unit 84, and the terminal unit 84 which supplies the conditioned air to the zone 34 to be controlled. A branch duct damper 74 controls the flow of conditioned air through the branch duct 82 from the supply duct 80 to the terminal air unit 84. A controller 68 is operably connected to and in control of the branch duct damper 74. A first communications medium TX1 such as the bus 72, using twisted pair, power line carrier, cable, or the like links the controller 68 to the central receiver 66, to other controllers 68, and to a building automation system 76 if provided. The controller 68 controls the position of the branch damper 74, and thereby volume of airflow to the zone 34, in response to information received from the zone sensor 58 over the first communications medium TX1. Unlike conventional approaches, the zone sensor 58 of the present invention has no physical connection to the controller 68. Instead, the zone sensor 58 communicates information in the general form of the data packet 86 to the central receiver 66 using a wireless second communication medium TX2 such as spread spectrum radio frequency transmissions. The central receiver 66 is operably connected to the first communications medium TX1 and retransmits the zone sensor data packet 86 onto the first communications medium where the controllers 68 can access the information in the zone sensor data packet 86.

Figure 5:
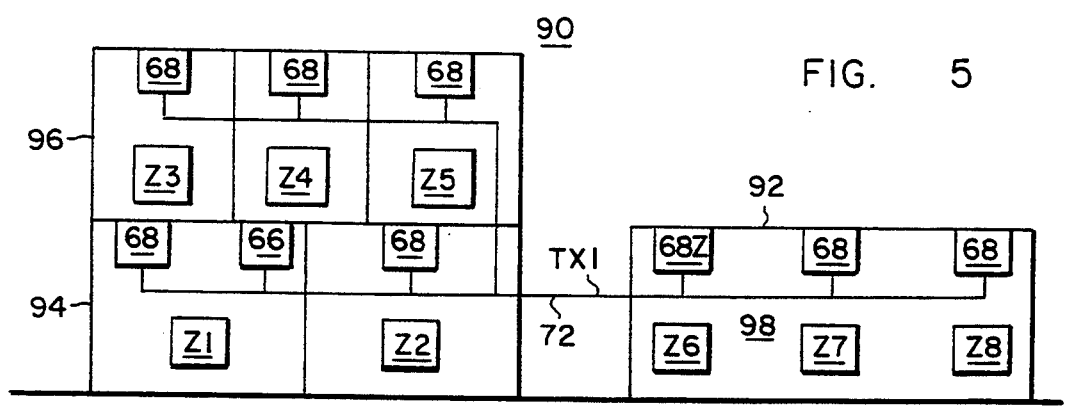
FIG. 5 shows an example of the invention as described in FIGS. 2 through 4.

FIG. 5 is an example of the present invention applied to a pair of distinct buildings 90, 92. One building 90 has a first floor 94 having two zones Z1, Z2, and a second floor 96 having three zones Z3, Z4, Z5. The single story building 92 has an interior 98 which has been divided into three zones Z6, Z7, Z8. Each zone Z1 through Z8 has a controller 68 controlling a supply of conditioned air to the particular zone Z1 through Z8. For simplicities sake, the dampers, the duct systems, the air handling systems, and the air conditioning systems are not shown, but can be seen in reference to FIGS. 1 through 4.

In FIG. 5 there is one controller 68 for each zone Z1 through Z8, and each controller 68 is interconnected by the first communications medium TX1, e.g. the communications bus 72. The bus 72 is also connected to a single central receiver 66. Each zone Z1 through Z8 has a single zone sensor which, for the sake of simplifying this example, is also identified as Z1 through Z8. Each zone sensor Z1 through Z8 monitors environmental conditions and periodically, for instance at five minute intervals, transmits a data packet 86 similar to that shown in FIG. 6 to the central receiver 66 by means of the second communication medium TX2. The second communication medium TX2 is preferably spread spectrum radio frequency transmissions. The zone sensors Z1 through Z8 also transmit on every change of state or whenever a user command is entered. The central receiver 66 receives each transmission, reformats the transmission into the format required by the first communications medium TX1 and retransmits the reformatted information on the first communications medium TX1. Each controller 68 monitors the transmissions on the first communications medium TX1 and extracts and uses data from a pre-identified zone sensor or zone sensors Z1 through Z8. Each controller 68 may also respond to a general system broadcast on the first communications medium TX1 indicating, for instance, that a fire has been detected and appropriate measures should be taken.

As an example of the transfer of a data packet 86 from a zone sensor 68 to a controller 68, zone sensor Z6 transmits a data packet 86 containing a zone sensor identification code 86A, zone air temperature 86B and other information to the central receiver 66. This information is retransmitted over the communications bus 72, identified by a particular controller 68Z, and used to regulate the flow of conditioned air to the zone Z6. If the air temperature 86B is above the cooling setpoint 86D of the zone Z6, and the zone Z6 is in the cooling mode 86E, the controller 68Z will provide increased flow of cooled air to the zone Z6. If the air distribution system 32 is a changeover system which is currently providing heated air, the controller 68Z will call for cooling to the building automation system 76 or to the water chiller 54. The controller 68Z will then act to minimize the amount of heated air allowed into the zone Z6.

The controller 68Z preferably includes means for maintaining the best available mode of operation in the event that the designated zone sensor Z6, the primary preferred sensor, should fail. For example, if the controller 68Z does not receive information from its designated primary zone sensor Z6 within a predetermined time frame, such as a five or ten minute period, the controller 68Z monitors transmissions from a secondary zone sensor if available. In this case, the zone sensor Z7 can function as a secondary zone sensor because the zone sensor Z7 is within the same physical space, i.e. the interior 98, and because the controller 68Z has previously been programmed by a building automation system 76 or a setup tool 320 to recognize Z7 as a secondary zone sensor. This has the advantage that the controller 68Z can continue to operate with actual feedback from the building interior 98 rather than shutting down or controlling airflow based upon some programmed default mode which has no temperature feedback. Furthermore, should the secondary zone sensor Z7 fail, the controller 68Z can recognize the zone sensor Z8 as a tertiary source of information, and continue to supply conditioned air to the zone Z6 using information supplied from the zone sensor Z8. Only when the primary sensor and all designated alternate sensors fail will it be necessary to shutdown or operate in a preprogrammed default mode of operation. Such a preprogrammed mode of operation might compare default setpoints to supply air temperature as measured by a supply air temperature sensor (not shown) hard wired to the first communications medium TX1, or, in a retrofit environment, might continue to operate using information provided by hard wired zone sensors if any such zone sensors remain attached to the system.

Figure 7:
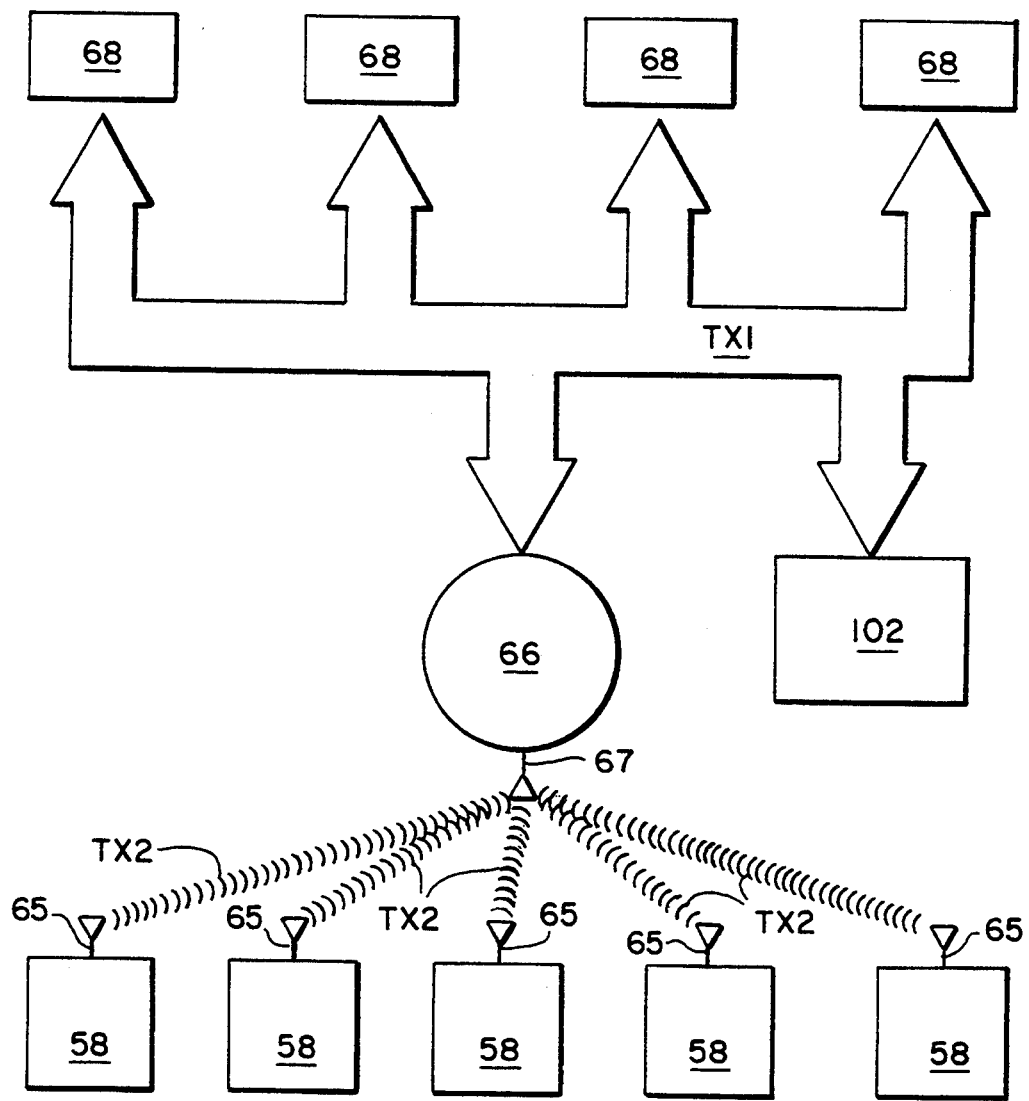
FIG. 7 shows the hierarchical structure of FIG. 4 further including a coordinating controller.

FIG. 7 shows the structure of the present invention where a coordinating controller 102 has been added to the hierarchical control system shown in FIG. 4. A coordinating controller 102 communicates with each of the controllers 68 by means of the communications bus 72, and coordinates the activities of those controllers 68. The coordinating controller 102 receives operating information such as damper position and zone temperature from the controller 68 and transmits command information such as setpoints and open/close commands to the controllers 68. The coordinating controller 102 facilitates building monitoring and scheduling on a smaller scale than a building automation system 76, and in fact can comprise an element of a building automation system 76. Both the coordinating controller 102 and the building automation system 76 include a broadcast function allowing the transmission of system wide commands and data. Examples of the broadcast function include the periodic broadcast of the outside air temperature to all controllers 68, and the broadcast of a command to instruct all controllers 68, or a group of controllers 68, to commence air balancing.

Second Embodiment

Figure 8:
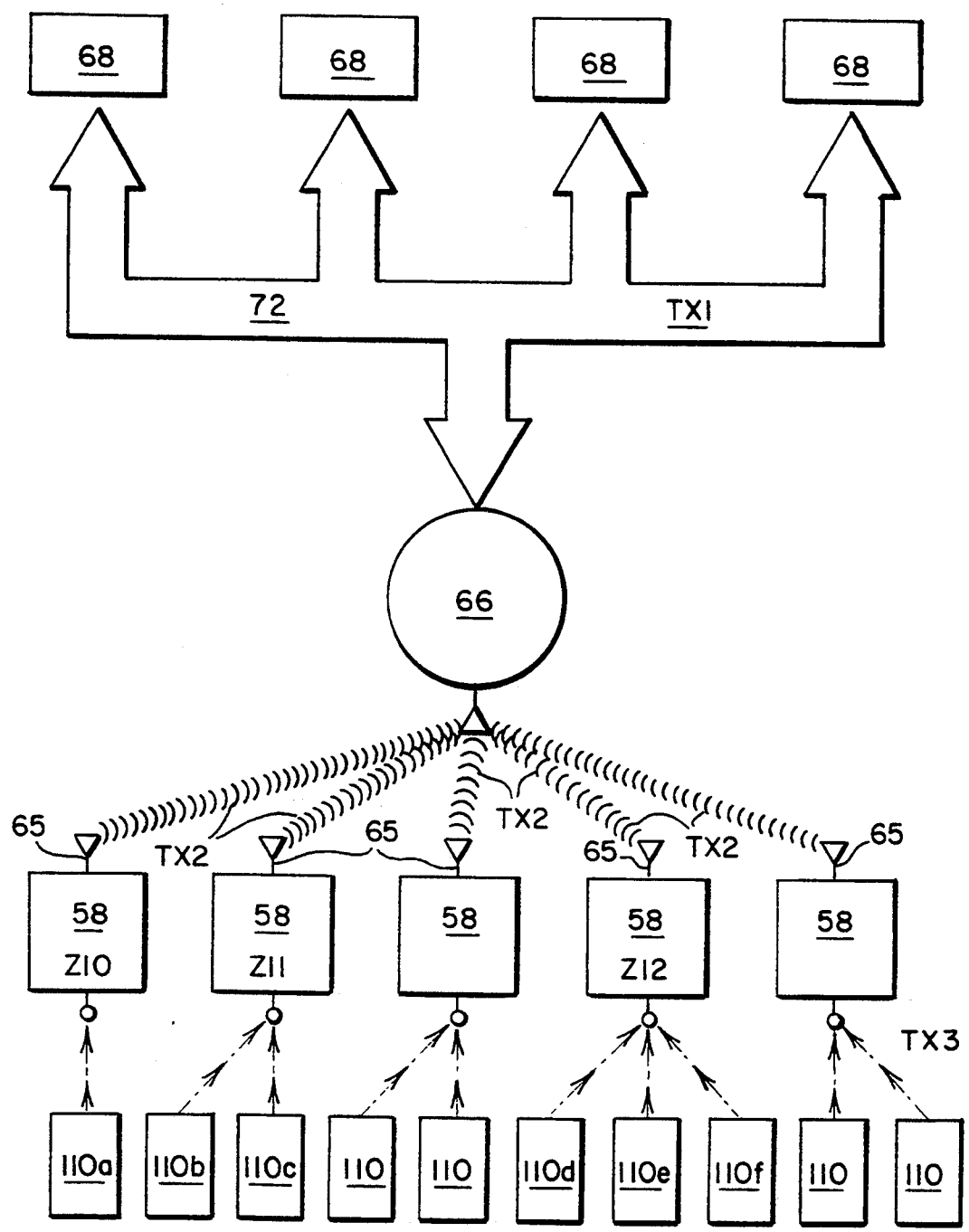
FIG. 8 shows the hierarchical structure of a second preferred embodiment of the present invention including first, second, and third communication media.

FIG. 8 illustrates the hierarchical structure of a second preferred embodiment of the present invention. The second embodiment adds a third communication medium TX3 transmitting personal comfort information from a plurality of personal comfort sensors 110. In this embodiment, the controllers 68 communicate, as before, by means of the first communications medium TX1, i.e. the communications bus 72. A plurality of zone sensors 58 transmit zone information to the central receiver 66 using a second communication medium TX2 such as spread spectrum radio frequency transmissions. The central receiver 66 reformats the transmissions from the zone sensors 58 and retransmits the zone information on the first communications medium TX1 for use by the zone controllers 68.

FIG. 22 shows a block diagram of a personal comfort sensor 110. The personal comfort sensor 110 includes a housing 340 which includes a microprocessor controller 342; a TX3 output device 344 such as a wired connector 344D, an infrared transmitter 344B, a radio transmitter 344A or a spread spectrum RF transmitter 344C; and a power source 346 such as a battery. A battery monitor 348 is provided to monitor the level of the power source 346 if the power source 346 is depletable. Additionally and as described in connection with the zone sensor 58, the personal comfort device 110 is provided with the capability to enter a dormant, power saving state if the power supply 346 is depletable. The personal comfort sensor 110 also includes various inputs to the microprocessor controller 342 such as a timed override input 350, an air temperature input 352, an air flow input 354, a lighting comfort level input 355, an air quality input 356, a comfort indication input 358 and a generic sensor input 359. The personal comfort sensors 110 each monitor the conditions within a localized region and transmit the monitored information in a personal comfort data packets 100 to predetermined zone sensors 58. The predetermined zone sensors 58 then retransmit the personal comfort information to the central receiver 66 either as a separate data packet on the second communication medium TX2, or incorporate the personal comfort information into the zone sensor data packet and send a single transmission for subsequent retransmission on the first communications medium TX1.

For instance, the zone sensor 58 identified as Z10 in FIG. 8 receives a transmission from the personal comfort sensor 110a on the third communication medium TX3 and retransmits the information to the central receiver 66 on the second communication medium TX2 for subsequent retransmission on the first communications medium TX1. The zone sensor 58 identified as Z11 receives transmissions from the personal comfort sensors 110b and 110c on the third communication medium TX3, retransmits the personal comfort information on the second communication medium TX2 to the central receiver 66, which subsequently retransmits the information on the first communications medium TX1. The zone sensor 58 identified as the Z12 receives transmissions from the personal comfort sensors 110d, 110e, and 110f by means of the third communication medium TX3, and retransmits those personal comfort information packets to the central receiver on the second communication medium TX2, for subsequent retransmission on the first communications medium TX1. The use of a third communication medium TX3 prevents the central receiver 66 from being overloaded with incoming transmissions, while facilitating the grouping of sensors in logical arrangements.

The third communication medium TX3 is preferably a wireless communications medium distinct from the second communication medium TX2 so that the third and second communication mediums TX3,TX2 do not interfere with each other's transmissions. For instance, if the second communication medium TX2 is spread spectrum radio frequency, the third communication medium TX3 is preferably infrared, ultrasonic, or narrow band radio frequency transmissions. The third communication medium TX3 can also be a hard wired connection between the personal comfort sensor 110 and the zone sensor 58 such as a cable, a twisted pair link, or an optic fiber link. Alternatively, the third communications medium TX3 can be the same communications medium as the second communications medium TX2, if the two media are readily distinguishable, such as, for example, by the use of distinct frequencies. Alternatively, distinct, non-interfering spreading algorithms could be employed by the second and third communications media TX2, TX3.

FIG. 9 shows a personal comfort data packet 100 for transmission by a personal comfort sensor 110. That data packet 100 includes a personal comfort identification code 100A, air temperature 100B, air flow 100C, air quality 100D, a personal comfort indicator 100D that the user is either too warm or too cold, a battery status 100F, the initiation of timed override 100G by a user, and a lighting comfort level indication 100H that zone lighting is too dim or too bright. Preferably the personal comfort data packet 100 is prefixed by a message type 100T. Additionally, the personal comfort sensor 110 can include an accompanying generic sensor input 359 which allows, for example, a humidity sensor (not shown) to be connected to a personal comfort sensor 110 and to forward humidity data 100I. At different times, other sensors can also be connected to the generic sensor input 359 such as an occupancy sensor. In this case, the personal comfort data packet 100 indicates the occupied/unoccupied status 110i of the area being monitored by the occupancy sensor.

FIG. 2 shows a personal comfort sensor 110 transmitting this information by infrared transmission on the third communication medium TX3 to an infrared receiver 112 included in the zone sensor 58. The zone sensor 58 receives the transmission of a personal comfort data packet 100 from the personal comfort sensor 110 and appends the personal comfort sensor data packet 100 to the zone sensor's data packet 86. This is subsequently discussed with regard to FIG. 13. A single transmission is then made to the central receiver 66 by the zone sensor 58 on the second communication medium TX2. The central receiver 66 then either places the zone sensor transmission on the first communications medium TX1 unaltered, or separates the zone sensor data packet 86 and the personal comfort data packet 100 from each other and transmits each on the first communications medium TX1 independently.

The personal comfort sensor 110 shown in FIG. 2 also includes a comfort indication input 358 such as a comfort indicator switch 114 having a neutral position, a warmed air request position and a cooled air request position which a user can use to indicate that the user is too warm, or too cold. The user's indication is incorporated into the personal comfort sensor data packet 100 as the comfort indicator 100E and transmitted to the relevant zone sensor 58. Although the comfort indicator switch 110 is described as having a neutral position, a warmed air request position, and a cooled air request position, the comfort indicator switch 110 can have further positions such as energy efficiency.

The information provided by the personal comfort sensors 110 generally relates to system controllable elements such as zone air temperature, zone air quality, zone air flow, and zone energy efficiency. Zone energy efficiency is an optional user input which allows the user to indicate to the controller 68 that the user is more interested in energy efficiency and energy conservation than in personal comfort and that the controller 68 can shift the boundaries of comfort control in an energy efficient or energy conserving manner. Energy efficiency allows a user to tell the zone controller 68 that the user is more interested in energy efficiency and in energy conservation than in the user's personal comfort. The controller 68 is then authorized to automatically vary the cooling setpoint, the heating setpoint, and the mode of operation so as to condition the zone in the most energy efficient manner. For instance, when operating in an energy efficient mode on a cool day, the heating setpoint might be automatically lowered 2° F. so that the heating system operates less often. Similarly, on a warm day the cooling setpoint might be automatically raised 3° F. so that the cooling system operates less often.

The personal comfort sensor 110 also includes a lighting comfort level input 100I which allows a user to indicate that lighting 38,75 is too bright, too dim, or should undergo a change of state from off-to-on, or on-to-off. The controller 68 receives the lighting comfort level input 100H and controls the zone lighting system 75 accordingly.

FIG. 10 illustrates an example of the second preferred embodiment. A building 118 having a first floor 120 and a second floor 122 is divided into three zones 124, 126, 128, each zone 124, 126, 128 having a zone sensor 58 respectively designated Z13, Z14, Z15. In this case, each floor 120, 122 is provided with a central receiver 66, which might be necessary if the material 121 separating the floors 120, 122 significantly impedes the transmissions on the second communications medium TX2. The central receiver 66 on the second floor 122 receives data packets 86, 100 transmitted from the zone sensor Z13 and the personal comfort sensors 110g, 110h, 110i, and 110j; and retransmits the data packets 86, 100 on the first communications medium TX1 for use by the controllers 68a, 68b. The central receiver 66 on the first floor 120 receives data packets 86, 100 transmitted from the zone sensors Z14, Z15 and the personal comfort sensors 110k, 110L and retransmits the data packets 86, 100 on the first communications medium TX1 for use by the controllers 68c, 68d, 68e. The situation where a central receiver 66 receives a zone data packet 86 through the flooring material 121 and retransmits the zone data packet 86 intended for the central receiver 66 of another floor is not a problem. This is because a controller 68 will merely be instructed to perform the same operation twice.

The zone sensor Z13 transmits zone sensor information for use by controller 68a and 68b, the zone sensor Z14 transmits information for use by the controller 68c, and the zone sensor Z15 transmits information for use by the controllers 68d and 68e. The zone 124 might be an office area having half walls 130 separating individual office areas 132. In a situation where the sun heats a first end 134 of the zone 124, and the wind cools a second end 136 of the zone 124, the placement of a single zone sensor Z13 might be impossible to provide uniform air temperature throughout the zone 124. However, using the second embodiment of the present invention, some or all of the individuals areas 132 can be provided with personal comfort sensors 110, preferably fixed in place unlike the personal comfort sensor of FIG. 2.

Each personal comfort sensor 110 transmits personal comfort information to the zone sensor Z13 by means of the third communication medium TX3. The zone sensor Z13 transmits all of the information from the zone 124 to the central receiver 66, including the zone sensor's own information as well as the personal comfort sensor information. The central receiver 66 then transmits the zone information on the first communications medium TX1 where the information is received by the controller 68a and 68b. Controller 68a preferably controls the environment in the zone 124 using the temperature information provided by the personal comfort sensor 110g, the personal comfort sensor 110h and the zone sensor Z13. The controller 68b preferably controls the environment of the zone 124 using temperature information provided by the personal comfort sensor 110i, the personal comfort sensor 110j, and the zone sensor Z13. The zone 126 is controlled solely in response to zone sensor Z14, while the controllers 68d and 68e control the zone 128 by averaging the air temperatures reported by the zone sensor Z15 and the personal comfort sensors 110k and 110L.

A number of approaches, some of which are discussed in connection with FIG. 14, can be used to allow the controllers 68 to control the environment using multiple sensors. These approaches include averaging the air temperature received from each of these sensors, weighting the air temperatures and/or setpoints received from the sensors, selecting mode of operation in accordance with the mode requested by a majority of sensors, or controlling the environment to minimize the largest deviation from setpoint of any one of the sensors.

Third Embodiment

Figure 11:
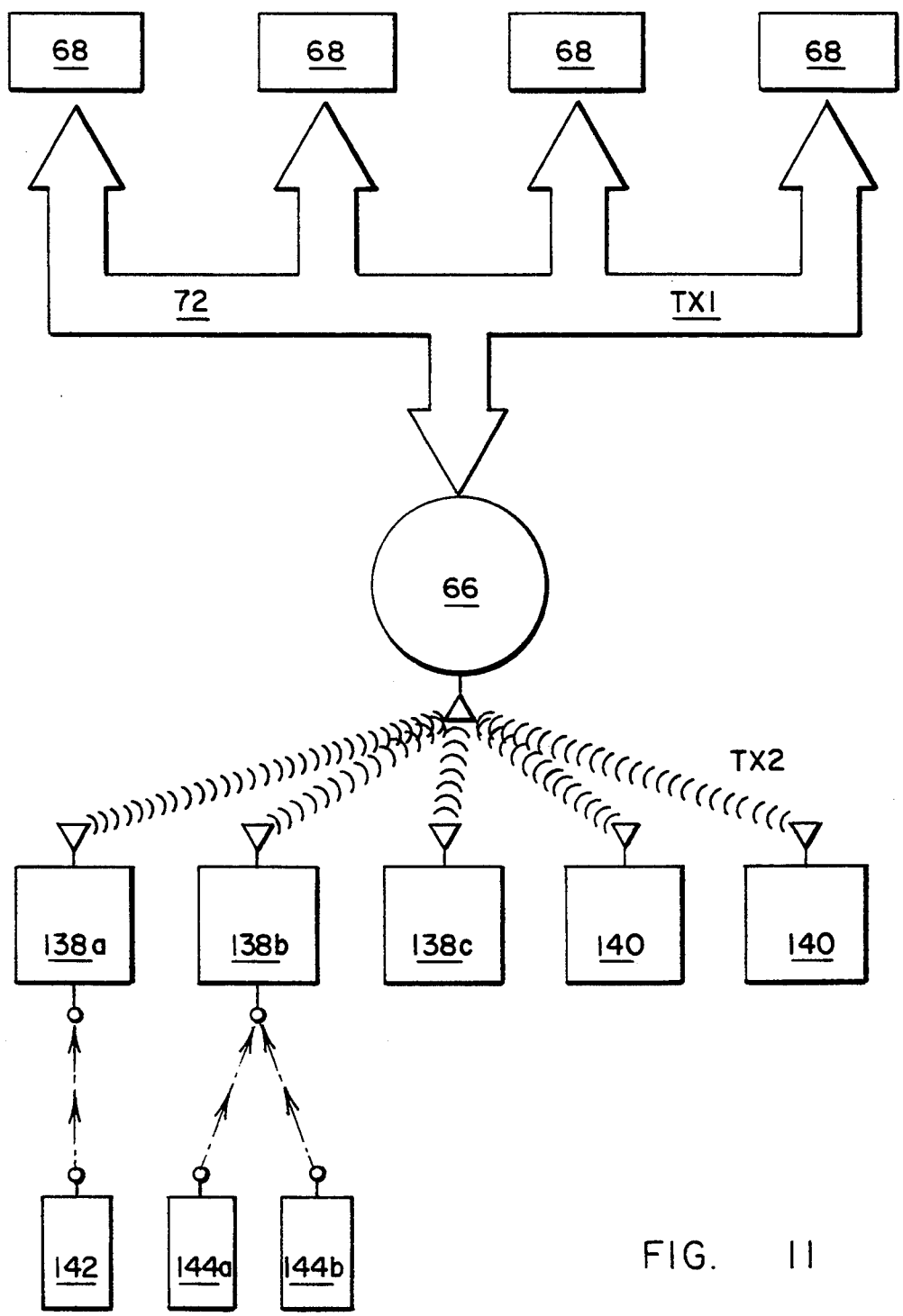
FIG. 11 shows the hierarchical structure of a third embodiment of the present invention.

FIG. 11 shows the hierarchical structure of a third embodiment of the present invention. In the third embodiment, the zone sensors 68 and the personal comfort sensors 110 can each transmit on either the third communication medium TX3 or on the second communication medium TX2. For economic reasons and for the sake of simplicity, it is preferable that the zone sensors 68 and the personal comfort sensors 110 be provided with the capability to transmit on either one or the other of the second or third communications media TX2, TX3 and not on both media. This selection is expected to be made by the system designer.

In FIG. 11, three zone sensors 138 and two personal comfort sensors 140 transmit zone data packets 86 to the central receiver 66 on the second communication medium TX2. A personal comfort sensor 142 also transmits data on the third communication medium TX3 to zone sensor 138a for incorporation into the zone data packet 86 of zone sensor 138a and subsequent retransmission to the central receiver 66. Two additional personal comfort sensors 144a and 144b transmit data to the zone sensor 138b by means of the third communication medium TX3 for subsequent retransmission to the central receiver 66 on the second communication medium TX2. The central receiver 66 reformats the zone data packets 86 and retransmits those zone data packets on the first communications medium TX1 where the zone data packets 86 can be accessed by the controllers 68.

The third embodiment has the advantage that airflow and other data sensed by the personal comfort sensors 110 can be supplied to the controllers 68 without the necessity of implementing a third communication medium TX3. Additionally, the interchangeability of the zone sensors 58 and the personal comfort sensors 110 provides greater user flexibility in designing economical and efficient air distribution systems, particularly where there is a cost disparity between either the personal comfort sensors 110 and the zone sensors 58, or between the second communication medium TX2 and the third communication medium TX3. If desired, a zone sensor 58 can be used transmitting on the third communication medium TX3.

Figure 12:
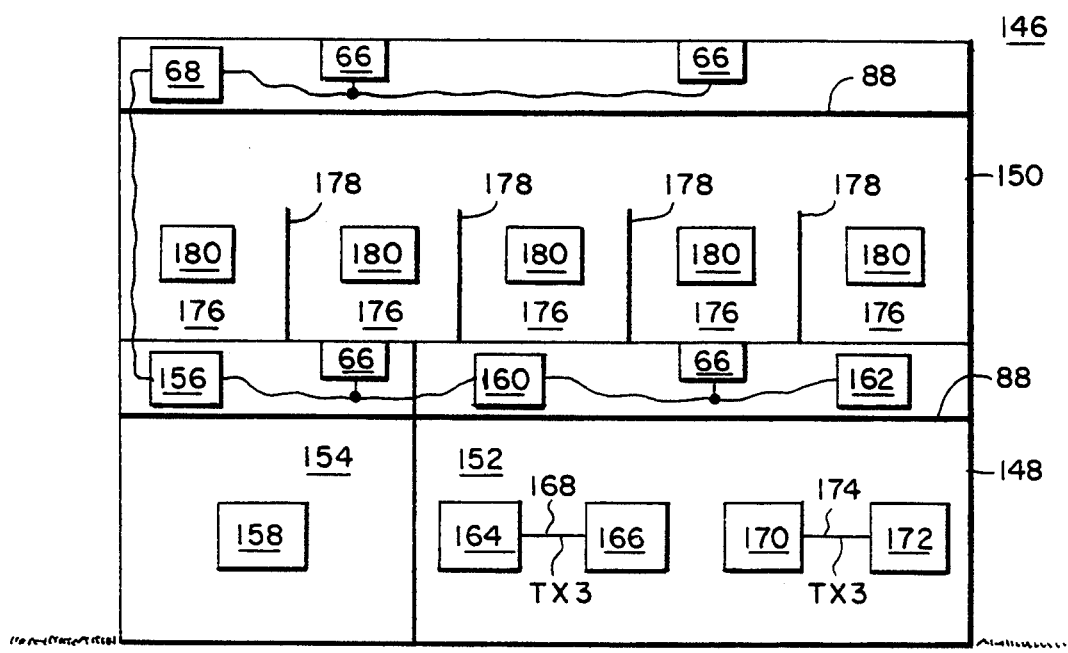
FIG. 12 shows an example of the third embodiment of the present invention.

FIG. 12 is an example of the third embodiment of the present invention as applied to a two story building 146. The two story building 146 has two floors 148 and 150, the first floor 148 of which includes two large areas 152 and 154. The large area 154 is a single zone controlled by a single controller 156 and a single zone sensor 158. The other large area 152 is serviced by two controllers 160 and 162. The controller 160 receives zone data packets 86 from a zone sensor 164 and a personal comfort sensor 166 connected to the zone sensor 164 by a cable type link 168 which implements a third communication medium TX3. The controller 162 is supplied with zone sensor data packets 86 by a zone sensor 170 and a personal comfort sensor 172. The zone sensor 170 is provided with data from the personal comfort sensor 172 over a fiber optic link 174 which implements the third communication medium TX3.

The second story 150 of the building 146 includes offices 176 separated by half walls 178. Each office 176 includes a portable personal comfort sensor 180 which transmits zone data packets 86 over the second communication medium TX2 to the central receiver 66 for subsequent retransmission on the first communications medium TX1 to the controller 68.

FIG. 12 also illustrates the use of redundant central receivers 66, where each floor 148, 150 is provided with a pair of identical central receivers 66. Each of the central receivers 66 is expected to act as a backup to the other central receiver 66. Consequently, each central receiver 66 is constantly retransmitting all transmissions received on the second communications medium TX2. Effectively, while both central receivers 66 are operative, each zone data packet 86 is received redundantly by the relevant controller 68. If the redundant transmissions by the redundant receivers 66 begins to degrade the first communications medium TX1, it is preferable to modify the data files within the memory 364 so that a minimum time between transmissions to any particular controller 68 is formed. This minimum time limit is mathematically determined to minimize collisions on the first communications medium TX1, and could be on the order of 30 seconds. Alternatively, to reduce transmissions on the first communications medium TX1, the redundant central receiver 66 can be instructed to operate normally with the exception that no transmissions on the first communications medium TX1 are made unless an "active" central receiver 66 fails to transmit an expected data packet 86, 100 or command within a preset time period. The execution of duplicate instruction or the response to duplicate data packets 86 by the zone controllers is immaterial because the instructions and the redundant zone data packets 86 are identical.

FIG. 13 shows a zone data packet 86 such as might be sent by the zone sensor 138b of FIG. 11 and includes the data from the personal comfort sensors 144a and 144b. For simplicity of transmission, in the preferred embodiment all transmissions on the second communication medium TX2 are of the same fixed length, thus enabling the central receiver 66 to readily recognize complete data transmissions. The data packet 86 includes three sections 182, 184, 186 respectively directed to the data from the zone sensor 138b, the personal comfort sensor 144a and the personal comfort sensor 144b. Each section 182, 184, 186 is preferably preceded by a message type respectively 182T, 184T, 186T. The zone sensor section 182 includes a zone sensor code 190, zone air temperature 192, heating setpoint 194, cooling setpoint 196, mode of operation 198, battery status 200, and timed override status 202, for the zone sensor 138b. The data packet 86 also includes the data section 184 from the personal comfort sensor 144a including the personal comfort sensor identification code 206, personal comfort sensor air temperature 208, airflow 210, air quality 212, user's lighting comfort level 213, user's comfort indicator 214, battery status 216, and timed override 218. The third section 186 of the data packet 86 is the data associated with the personal comfort sensor 144b including the personal comfort sensor identification code 220, air temperature 222, airflow 224, air quality 226, user's lighting comfort level 227, user comfort indicator 228, battery status 230, and timed override 232.

Each zone sensor in the system shown in FIG. 11 will transmit a data packet of this length. In the case such as the zone sensor 138a and the personal comfort sensor 142, the section 186 will be blank as a second personal comfort sensor does not report to the zone sensor 138a. In the case of the zone sensor 138c, both the sections 184, 186 will be blank as no personal comfort sensor reports to the zone sensor 138c. Finally, in the case such as personal comfort sensor 140, the sections 182, 186 will be left blank as no zone sensor or second personal comfort sensor is present. In this last case, the personal sensor identification code 206 of the personal comfort sensor 140 might be copied to the zone sensor identification code 190 for ease of identification by the controllers 68. The use of fixed length transmissions enables the central receiver 66 to recognize the completeness of the data packet 86, and reformat and retransmit the data packet on the first communications medium TX1. A specific controller 68b is able to monitor the first communications medium TX1 for data packets 86 having the identification code for zone sensor 138b, personal comfort sensor 144a, and/or personal comfort sensor 144b. However, it should be recognized that the present invention need not be implemented using a single fixed length data packet. For instance, variable length data packets identified with stop/start identifiers could be implemented, or each sensor could transmit an independent and unique data packet.

Operation

Figure 14:
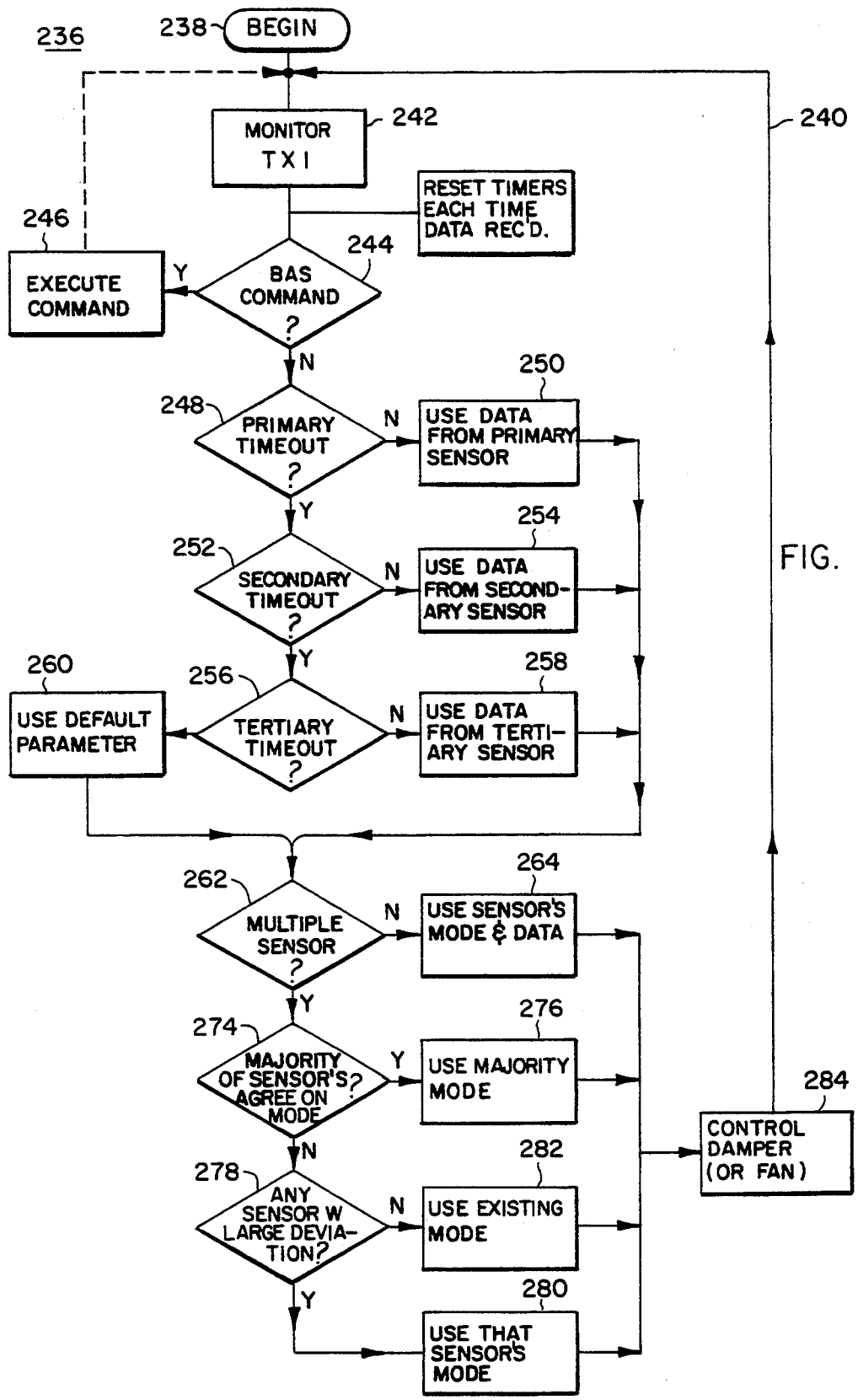
FIG. 14 shows the operation of a controller being provided with data from a multiplicity of sensors.

FIG. 14 is a flow chart showing the operation of a controller 68 being provided with data from a multiplicity of zone and personal comfort sensors 58, 110. The operation is shown by flow chart 236 where, after an initialization step 238, the controller 68 enters an endless loop 240. At step 242 the controller 68 constantly monitors the first communications medium TX1 for activity, and determines if that activity is either a command from a building automation system 76 or a setup tool 320, or a zone data packet 86 from one of a plurality of predesignated zone sensors 58 and personal comfort sensors 110. The message type 86T, 100T, 182T, 184T, 186T and 104A prefixed to each data or command packet facilitates this determination.

Each time a relevant data packet 86 is received, data files associated with the particular zone sensor 58 or personal comfort sensor 110 are updated, and associated timers are reset. These timers or their equivalent are important to this system because the transmissions from zone sensor 58 to the controller 68 are essentially one way, and the controller 68 needs some means for determining when sensor failure or transmission medium failure has occurred. A fairly simple means of doing this is accumulating the elapsed time since the last valid sensor data transmission. An alternative approach is to compare the newest sensor data with the previous sensor data and determine if any deviation between the old and new data is reasonable in view of the time difference between the receipt of the old and new sensor data.

At step 244 the controller 68 determines if activity on the first communications medium TX1 is a valid command from a building automation system 76 or a setup tool 320, and if so, executes the command and recommences monitoring the first communications medium. If the activity on the first communications medium TX1 is information in the form of a zone sensor data packet 86, or if a predetermined time period (such as five minutes) has passed since activity has been detected on the first communications medium TX1, the controller 68 decides that a failure has occurred and determines which alternate zone sensor data should be used so as to maintain the best available mode of operation. In flow chart 236 each primary sensor has an alternate secondary sensor, and an alternate tertiary sensor. For the sake of illustration, zone sensors Z6, Z7 and Z8 from FIG. 5 are respective examples of a primary, secondary and tertiary zone sensor. At step 248 a timer for the primary sensor Z6, the sensor whose data should be used as the basis for controlling the zone environment, is checked to see if the timer indicates a failure by the sensor to provide data within the predetermined time period. If the timer has not expired, the data from the primary sensor Z6 is used. If the primary sensor Z6 has failed to provide recent data, the controller 68 at step 252 attempts to substitute a predesignated secondary sensor Z7 for the primary sensor Z6. This secondary sensor Z7 might be a personal comfort sensor 110 or might be the zone sensor 58 of an adjacent or similar zone. A timer can also be associated with the secondary sensor, and if the secondary sensor Z7 has provided recent data, that data is used at step 254. If the secondary sensor Z7 has failed to provide data within a predetermined time period, then a tertiary sensor Z8 might be substituted at steps 256 and 258 if the tertiary sensor Z8 has not failed. If all designated sensors have failed or if no sensor has provided fresh data, which might occur in the event of a component or partial system failure, the controller 68 operates using predefined default parameters at step 260. These predefined default parameters might be a preset mode of operation, i.e. minimum damper position, or might instruct the controller 68 to use the last valid data packet 86 from the primary sensor Z6 as a basis for modulating zone temperature. Alternatively, the controller 68 can either be instructed to supply air to the zone 34 using default setpoints and hard wired sensors such as supply air temperature sensors, or the controller 68 can be instructed to terminate operations.

Once the controller 68 has established which sensor's data is to be relied upon in operation, the controller 68 selects a mode of operation. In the case of a system where a single sensor is associated with a single controller 68, the mode of operation is the mode 86E designated in that particular zone sensors data packet 86. At step 262 the controller 68 determines if such a single sensor system is being used and, if so, uses the mode 86E and data at step 264 from that sensor's data packet 86.

Figure 15:
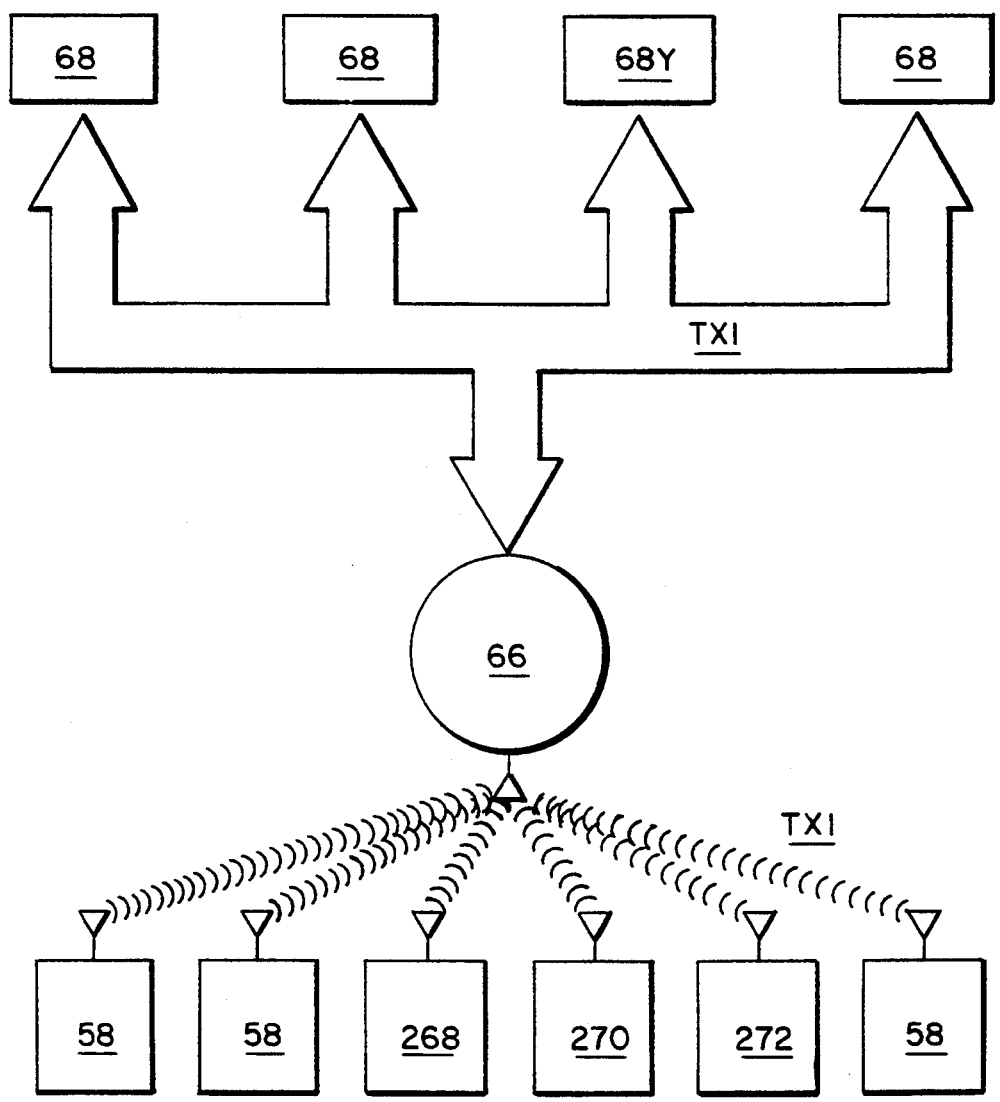
FIG. 15 shows a hierarchical structure for the first embodiment of the present invention where several sensors provide a single controller with data.

However, in a multi-sensor system such as that shown in FIG. 15, the controller 68 must determine how to use the data provided. In FIG. 15 three zone sensors 268, 270, and 272 provide information to a single controller 68Y. Several options are available to the controller 68 once a multi-sensor system has been recognized at step 262. For instance, step 274 shows a voting arrangement where the mode of operation is selected based upon the modes requested in the zone sensor data packets 86 by the majority of sensors 268, 270, 272 at step 276. If no majority exists, the mode of operation is selected at 278 using the mode requested by the sensor with the largest deviation from setpoint. If no such sensor exists, the existing mode is continued at step 282.

Once the mode of operation is selected, the damper 74 is controlled at step 284 using either a temperature average from all designated sensors as compared to a master setpoint, or by using a representative sensor. The master setpoint can be explicitly designated, or can be implicitly designated by its order in the controller's data structure. Additionally, either the sensor temperature data or the zone setpoint can be determined using a weighted average. For example, in a three sensor system two peripheral sensors might have their setpoint and temperature information weighted at 30% each while a centered sensor might have its setpoint and temperature data weighted at 40%.

As an alternative to controlling the damper 74 at step 284, the speed of a variable speed fan (not shown) in a terminal unit 48 might be controlled. Regarding system initialization, a building automation system 76 or a setup tool 320 is used to initially convey the selection of the zone sensor system to the controller's 68, and to subsequently alter any parameters. In the event of a conflict between the building automation system 76 and the setup tool 320, the building automation system 76 will override the setup tool 320.

Figure 16:
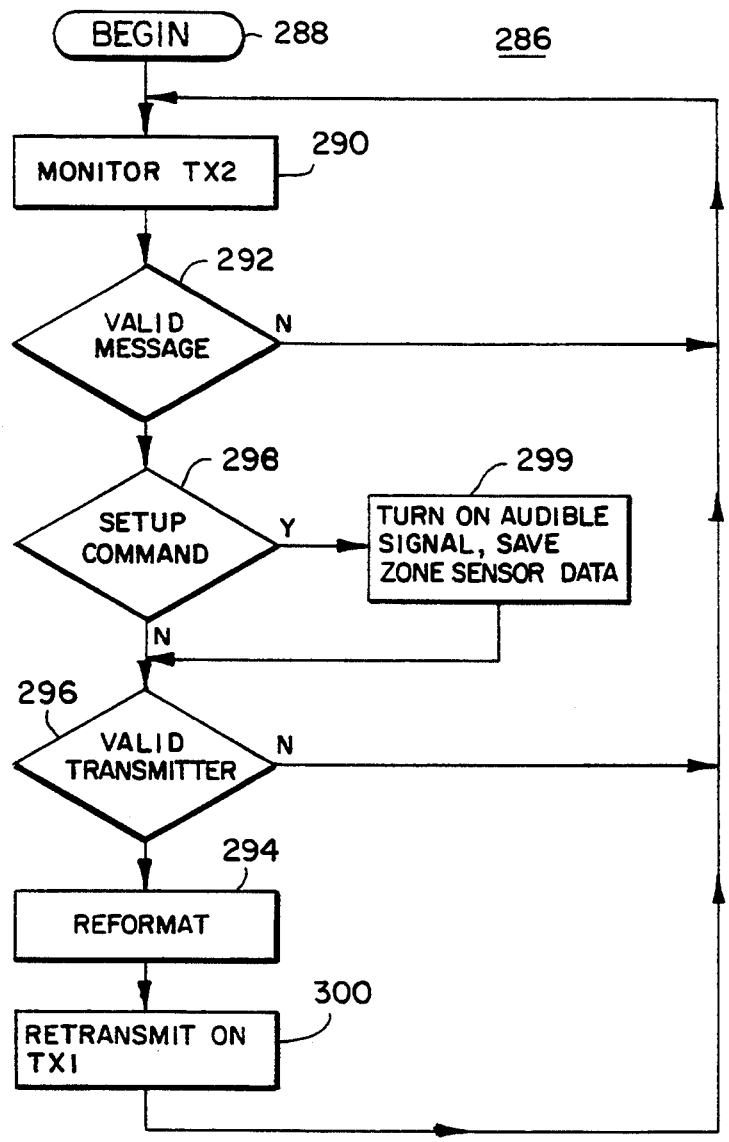
FIG. 16 shows the operation of the central receiver.

FIG. 16 shows the operation of the central receiver 66 in the form of a flow chart 286. The flow chart 286 begins with an initialization routine at step 288 and then constantly monitors the second communication medium TX2 at step 290. Messages such as data packets 86,100 or commands received on the second communication medium TX2 are checked for validity at step 292. If the message is valid at step 292, the message type 104A, 86T, 100T, 182T is checked to see if the message is a setup command at step 298. If so, an audible tone is sounded at step 299 and the message data is added to the internal list. The validity of the message transmitter itself is checked against an internal list of valid transmitters at step 296. The message is reformatted at step 294 into the data format used on the first communications medium TX1 and transmitted on the first communications medium TX1 at step 300. Although the present invention is disclosed in terms of reformatting the data from the second communication medium to the format used in the first communications medium TX1, it should be recognized that these data formats could be similar and the reformatting step omitted.

Figures 17, 18:
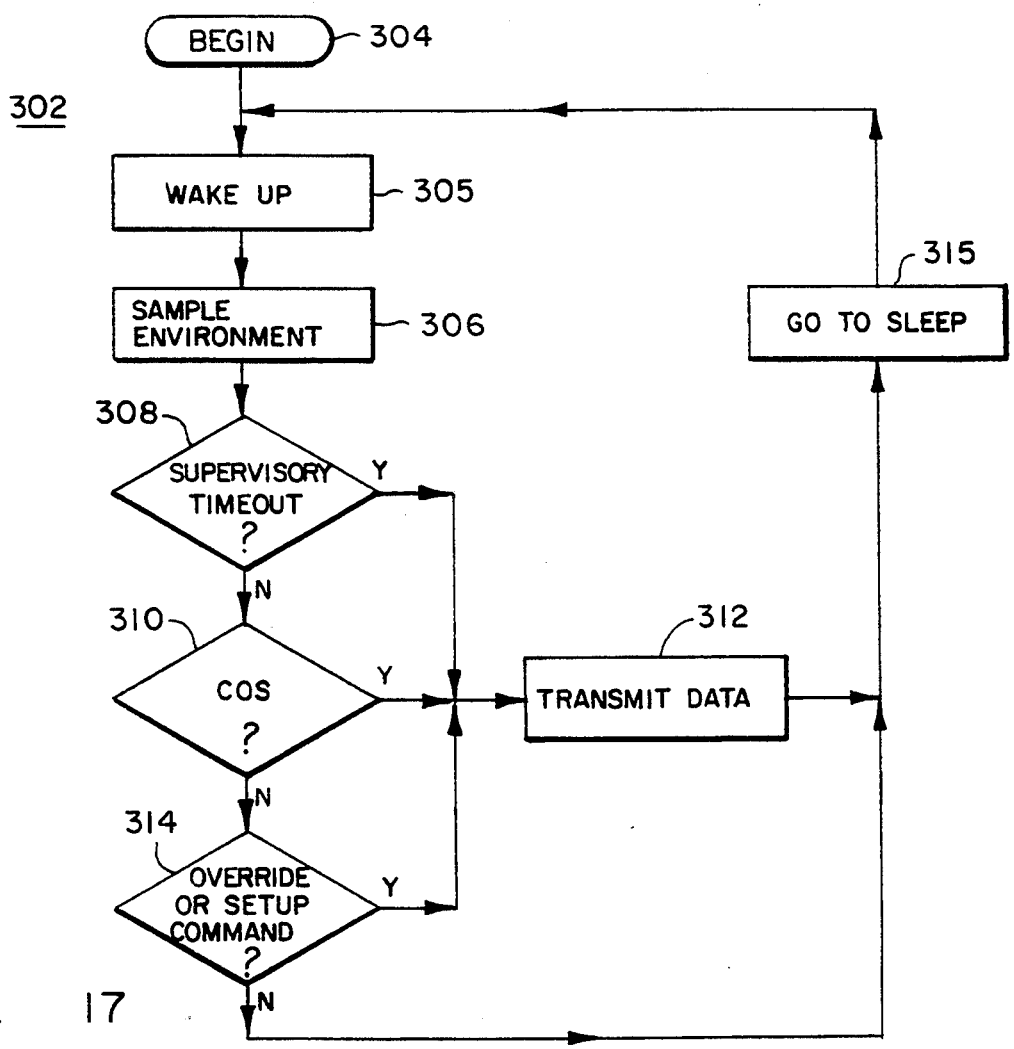
FIG. 17 shows the operation of a typical zone or personal comfort sensor.
FIG. 18 shows a command data packet such as might be transmitted by a building automation system or by a setup tool.

FIG. 17 is a flow chart 302 showing the operation of a typical zone or personal comfort sensor 58, 110. After beginning the flow chart 302 at step 304 with an initialization routine, the zone or personal comfort sensor 58, 110 is activated or awakened from a dormant state at step 305 by either (1) a hardware timed interrupt on the order of every two seconds, (2) the receipt of a personal comfort data packet 100 from a personal comfort sensor 110, (3) a change of state such as an input from the timed override switch 70, the setpoint device 60, or the mode of operation selector 62, or (4) the receipt of a command data packet 104 from a setup tool 320. The zone or personal comfort sensor 58, 110 then monitors the environment of the zone 34 at step 306 by sampling and filtering the temperature 64, by sampling the timed override switch 70 and the mode of operation switch 62, and by sampling a setpoint wheel 60. A software timer is periodically checked at step 308 to ensure that the zone or personal comfort sensor 58, 110 sends data no more often than 30 seconds but at least every five minutes, whether or not a change of state has occurred. Additionally, any time a change of state occurs or a command or data packet 104,100 has been received, data is transmitted at steps 310 and 312. At step 314 the zone sensor 58 determines if a command data packet 104 has been received either by a physical connection 316 or by the third communications medium TX3. If a command data packet 104 has been received, and at least 30 seconds has elapsed since the last transmission, the data packet 104 is transmitted at step 312, otherwise the zone or personal comfort sensor 58, 110 goes to sleep at step 315. Going "dormant" is a method of conserving a non-renewable power source 59 such as a battery 59. If the power source 59 is continually renewed, it is not necessary to render the zone sensor 58 or personal comfort sensor 110 dormant. Each time data is transmitted, the software timer accumulating time since the last transmission is reset. Depending upon which embodiment of the present invention is being implemented, the zone or personal comfort sensor 58, 110 can transmit data at step 312 on either the second communication medium TX2, or the third communication medium TX3. Monitoring is then recommenced at step 306.

FIG. 18 shows a command data packet 104 containing a message type 104A, the controller identification code 104B of the controller 68 to which the command data packet 104 is being directed to, a zone identifier 104C identifying a particular zone 34 being assigned to the controller 68, designated by the controller identificator code 104B, and instructions 104D as to whether to add or subtract the zone 34 to or from the controller's memory 408. Additional commands can indicate that the controller's memory 408 should be purged 104E of zone assignments and data; that the data from the zone 34 be averaged 104F with other assigned zones 34; or the data from the zone 34 be used as a secondary or tertiary backup sensor.

Also commands can indicate, as subsequently discussed, that the zone setpoint 86C or 86D be used as a master setpoint 104G for comparison with averaged or weighted temperature information from a plurality of zones 34. A master setpoint 104G can be a 1 bit designation or, if setpoints are weighted by percentage between a number of zone sensors 58, the designation can be a weighted percentage of 100%. For example, in a three sensor zone, such as zone 128 of FIG. 10, having two interior sensors Z15,110k and one peripheral sensor 100L, the peripheral sensor 100L might be weighted 40% and the interior sensors Z15, 110k weighted 30% each. The controller 58 averages the temperature data from the three sensors, and compares that average to a setpoint determined from 40% of the peripheral zone setpoint 110L and 30% of each of the interior zone setpoints Z15,110k. However, if the peripheral zone sensor 110L was the master setpoint, the peripheral zone sensor 110L would be weighted 100% and the interior zone sensors Z15,110k each be weighted 0%.

Setup Tool

The controllers 68 receives their initial and subsequent programming and commands from either a building automation system 76, a coordinating controller 102, or a setup tool 320 by means of the first communication medium TX1.

Figure 20:
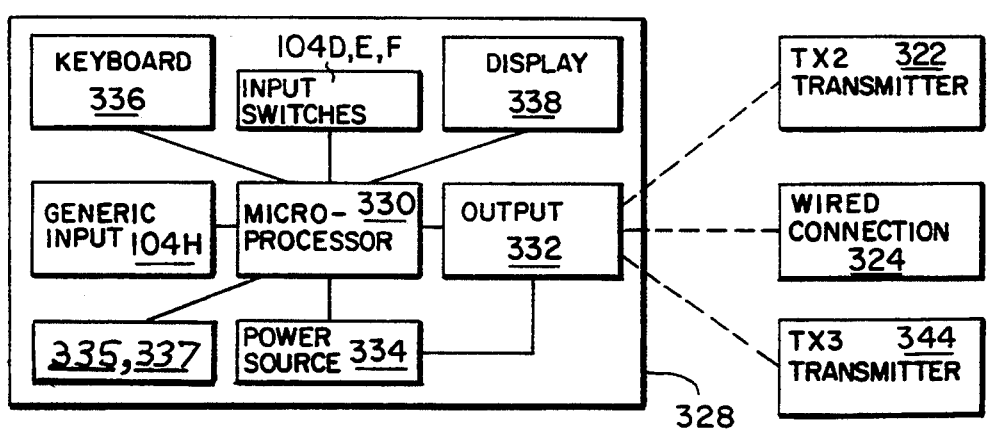
FIG. 20 is a block diagram of the setup tool of FIG. 19.
Figure 19:
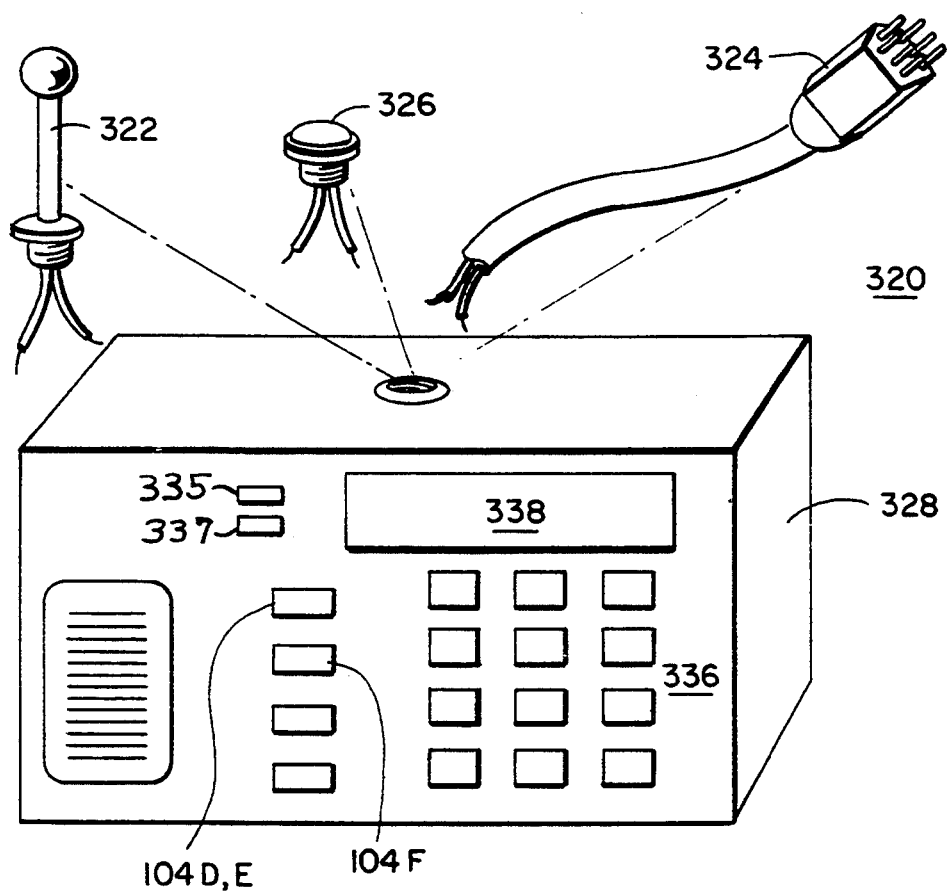
FIG. 19 shows a setup tool for programming controllers in accordance with the present invention.

In the case of the setup tool 320 shown in FIGS. 19 and 20, the setup tool 320 uses a non-physical link such as the second communication medium TX2 and possibly the third communications medium TX3 to provide programming, information or commands to any particular controller 68 by means of the central receiver 66. For instance, the setup tool 320 can be provided with a transmitter 322 so that programming instructions can be directly transmitted on the second communications medium TX2 to the central receiver 66 and thereafter to the controller 68. The setup tool 320 can also, or alternatively, be provided with a wired connector such as an electrical plug 324 capable of operatively interfacing with a mating connection 316 on a zone sensor 58 or a personal comfort sensor 110. The setup tool 320 programming instructions are then indirectly transmitted by the zone sensor 58 to the central receiver 66 for subsequent retransmission to the controller 68. The setup tool's may also directly or indirectly transmit programming instructions on the third communications medium TX3 using an infrared transmitter 326 or the electrical connection 324 to a personal comfort sensor 110, respectively.

The setup tool 320 typically includes a housing 328 containing a microprocessor controller 330; and output device 332 such as a radio transmitter 322, a wired connector 324, or an infrared transmitter 326; a power source 334 such as a battery or a household AC plug connector; a keyboard 336; a display 338; a number of input switches 104D, 104E and 104F; a power indicator 335; a transmit indicator 337; and a generic sensor input 104H. The generic sensor input 104H (subsequently discussed) allows a humidity or temperature sensor to be attached to the setup tool 320 and provide a sensed signal value for transmission through the hierarchical communications system. Additionally, the wired connector 324 may be designed to provide power from the setup tool 320 to a zone sensor 58 or a personal comfort sensor 110. Conversely, the setup tool 320 may parasitically draw power from a zone sensor 58 or a personal comfort sensor 110 or use the transmitter of a zone sensor 58 or a personal comfort sensor 110 by way of the wired connector 324.

The keyboard 336 and display 338 allow a user of the microprocessor controller 330 to construct program instructions and commands and transmit these programmed instructions as data packets 104. The transmissions may be directly on the second communications medium TX2 to the central receiver or indirectly on the third communications medium TX3 to the central receiver 66 by means of a zone sensor 58.

Commands from the setup tool 320 are transmitted in the same format shown in FIGS. 6, 9, and 13 and described in connection with FIGS. 7 and 18, except that the message type 104T is varied to indicate that a command packet 104 as opposed to a sensor data 86 is being transmitted to a particular controller 68. The message type also tells the controller 68 to look for the controller's own identification designator at the location 104B in the command data packet 104 instead of looking for the zone sensor identification code 86A.

When the central receiver 66 accepts a command from the setup tool 320, an audible signal is sounded by the audible annunciator 365. This provides an acknowledgement to the user of the setup tool 320 that the command has been received. It is highly advantageous to receive this acknowledgement in a one-way communication system such as that of the present invention. If desirable the audible tones may be coded or varied to indicate various responses to the command.

Generic Sensor Input

The present invention also contemplates a generic sensor input connection 49, 104H, 359 respectively associated with the zone sensor 58, the personal comfort sensor 110, and the setup tool 320. The generic sensor input 49, 104H, 359 allows an external device (not shown) such as a humidity or occupancy sensor to be attached to the zone sensor 58, the personal comfort sensor 110, or the setup tool 320. The zone sensor 58, the personal comfort sensor 110, or the setup tool 320 recognizes the attachment of a generic sensor to the generic sensor input 49, 104H, 359, identifies the type of generic sensor, and thereafter uses the generic sensor in a conventional manner. Numerous advantages are provided in the areas of system flexibility, as well as in system calibration and system problem diagnosis. Furthermore, the generic sensor input 49, 104H, 359 can also be used as an external power supply attachment for a zone sensor 58, a personal comfort sensor 110, or a setup tool 320 in need of additional or supplemental power. The generic sensor input 49, 104H may also be used as the interface 316 which allows a setup tool 320 having a connector 324 to plug that connector 324 into a zone sensor 58 or a personal comfort sensor 110. Conceivably, power may be provided to the setup tool 320 from the zone sensor 58 or the personal comfort sensor 110 by means of the generic sensor input 249, 104H.

Air Balancing

Customized air balancing is also contemplated by the present invention. Balancing is advantageous for two situations. Firstly, system balancing is required to balance the central air conditioning plant against the branches 82 to ensure that the HVAC system is capable of providing design airflows to all system components under maximum airflow conditions. Secondly, zone balancing is required to satisfy specific zone operating conditions such as the elimination of eddy or tornado-like effects in hallways, and the elimination or modification of extreme pressure zones.

When an air distribution system is installed, the entire air distribution system goes through an initial system balancing. Referring to FIGS. 2 and 3, balancing dampers 350 in the branch duct lines 82, and air flow meters 352 also in the branch duct lines 82, are used to balance the flow of air throughout the system. This is typically an iterative process wherein an air flow setpoint for each branch duct line 82 is determined by a system designer, and the balancing damper 350 in each duct 82 throughout the system is iteratively adjusted until all design airflow requirements are reached.

In the present invention the iterative process can be substantially eliminated by causing the building automation system 76 to simultaneously initiate balancing throughout the system. Each controller 68 is provided with an airflow setpoint, and when the signal from the building automation system 76 is received on the first communications medium TX1, the controller 68 begins to adjust its balancing damper 350 while comparing measured airflow from the air flow sensor 253 to the airflow setpoint. Since all the controllers 68 in the system are doing this simultaneously, air balancing can be quickly accomplished.

Additionally, the present invention facilitates rebalancing zones and localized portions of the air distribution system. Often the design airflow setpoint is subsequently found to be inadequate to meet the needs of a particular zone or group of zones. This may occur because pressure gradients cause too much or too little airflow into a given zone or group of zones, or because unforeseen conditions such as heat generating equipment or external sunlight exposure were not taken into account.

In such a situation, the air distribution system can use its broadcast function to cause a particular zone or group of zones to rebalance a localized portion of the air distribution system. The localized balancing is similar to system balancing on a more restrictive scale. Each controller 68 is provided with an airflow setpoint. When instructed to do so by the building automation system 76, the controller 68 adjusts its balancing damper 350 until measured airflow approximates the airflow setpoint. The setup tool 320 can also cause rebalancing to occur.

Additionally, indications of personal discomfort as received from the personal comfort sensors 110 using the comfort indication input 358 can be logged. If a pattern emerges that a particular zone or group of zones is consistently too warm or too cold, a particular controller 68 can automatically initiate rebalancing of its particular zone to a new airflow setpoint which may be adjusted, for example, by a factor of 5 percent from the previous airflow setpoint. The controller 68 may itself also request that the building automation system 76 evaluate rebalancing the particular group of zones that the controller 68 is a member of. If the controller 68 is provided with the identification codes of the other controller 68 in its particular localized portion of the air distribution system, the controller 68 can issue a broadcast message directly to those controllers 68 to initiate a localized rebalancing of the air distribution system.

The communications media described, including those of the first and third communications media TX1, TX2 and TX3, may conform to the communications protocol standards being developed by the ASHRAE STANDARDS PROJECT Committee as defined in "BACNet-A Data Communications Protocol for Building Automation and Control Networks, Working Draft No. 4", SPC-135P-.015, ASHRAE 1990. This publication is hereby incorporated by reference. The BACNet-A Data Communications Protocol addresses general system broadcasts, specific transmissions and treatment of existing proprietary protocols.

It should be recognized that modifications and alterations of the present invention as described and suggested herein are possible. Such modifications include a number of alternative wireless transmissions media for the second communications media, as well as variations in the third communications medium. Additionally, the volume and type of information transmitted can be varied as well as the uses to which the controller puts that information. Also, the zone or personal comfort sensors could include the capability to selectively transmit on either or both of the second and third communications media. Furthermore, the present invention can be applied to areas of air distribution such as system air balancing to improve those areas. Additionally, the type of chiller elements used as well as the controller application may vary. Also, the controller can combine or prioritize information from a number of sensors as described or suggested herein. Finally, the controllers referred to herein are not intended to be limited to control of airflow, and the invention is intended to encompass all applications requiring the transfer of data between a sensor and a controller. All such modifications and alterations are intended and contemplated to within the spirit and scope of the present invention.

What is desired to be secured by Letters Patent of the United States is claimed as follows:

1. A hierarchical control system comprising:
   a first central receiver;
   a first communications medium operably connecting the first central receiver to at least one controller;
   a controller operably connected to the first central receiver by the first communications medium;
   a first sensor sensing conditions;
   a second communication medium;
   a first transmitter transmitting the sensed conditions from the first sensor to the first central receiver via the second communications medium, the first central receiver including a first receiver receiving transmissions on the second communications medium and a second transmitter retransmitting the transmissions on the first communications medium;
   the system including a second sensor sensing conditions, the second sensor including a third transmitter transmitting the sensed conditions to the first central receiver via the second communications medium; and
   the controller including means for determining a failure of the first sensor, and means for substituting the sensed conditions from the second sensor for the sensed conditions of the first sensor.

2. The system of claim 1 wherein the second communication medium is a wireless medium.

3. The system of claim 2 wherein the second communication medium is spread spectrum radio frequency communications.

4. The system of claim 2 wherein the second communication medium is infrared communications or radio frequency communications.

5. A hierarchical control system comprising:
   a first central receiver;
   a first communications medium operably connecting the first central receiver to at least one controller;
   a controller operably connected to the first central receiver by the first communications medium;
   a first sensor sensing conditions;
   a second communications medium;
   a first transmitter transmitting the sensed conditions from the first sensor to the first central receiver via the second communications medium, the first central receiver including a receiver receiving transmissions on the second communications medium and a second transmitter retransmitting the transmissions on the first communications medium;
   a third communications medium; and
   a third sensor sensing conditions, the third sensor including a third transmitter transmitting the sensed conditions on the third communications medium;
   wherein the first sensor includes a receiver receiving sensed conditions transmitted on the third communications medium, and means for retransmitting transmissions from the third communications medium on the second transmissions medium.

6. The system of claim 5 wherein the third sensor includes an input connector and means for identifying and processing data received through the input connector.

7. A hierarchical control system comprising:
   a first central receiver;
   a first communications medium operably connecting the first central receiver to at least one controller;
   a controller operably connected to the first central receiver by the first communications medium;
   a first sensor sensing conditions;
   a second communications medium; and
   a first transmitter transmitting the sensed conditions from the first sensor to the first central receiver via the second communications medium, the first central receiver including a first receiver receiving transmissions on the second communications medium and retransmitting the transmissions on the first communications medium wherein the controller includes means for operating independently of a particular sensor.

8. The system of claim 7 wherein the independent operating means includes means for substituting a predetermined default sensor whenever a predetermined time period has expired without receiving a transmission from the first condition sensing means.

9. The system of claim 7 wherein the first sensor is portable and includes a self-contained source or means for receiving power from an external power source.

10. The system of claim 7 wherein the first sensor includes at least two sensors, and the independent operating means includes means for combining the data from the sensors.

11. The system of claim 10 wherein the combining means includes means for averaging the data from the sensors.

12. The system of claim 10 wherein the combining means includes means for prioritizing the data from the sensors.

13. The system of claim 10 wherein the combining means includes means for operating in a mode of operation determined by the data from the majority of the sensors.

14. The system of claim 7 further including means for providing supplemental conditioned air to localized areas within an environment in response to an occupant's signal.

15. The system of claim 7 including at least a second central receiver operably connected to the at least one controller, the second central receiver including a second receiver receiving transmissions on the second communications medium.

16. The system of claim 15 wherein the second central receiver functions as a backup to the first central receiver.

17. The system of claim 15 wherein the second central receiver operates independently of the first central receiver.

18. The system of claim 17 wherein the first and second central receivers are associated with separate floors of a building.

19. The system of claim 18 further including third and fourth central receivers respectively acting as backups for the first and second central receivers.

20. The system of claim 1 wherein the first sensor includes an input connector and means for identifying and processing data received from the input connector.

21. A system for transferring information from a sensor to a controller comprising:
a first communications medium;
a second wireless communications medium;
a controller operably connected to the first communications medium;
a receiver operably connected to the first communications medium, receiving communications on the second communications medium and retransmitting communications from the second communications medium on the first communications medium;
a first sensor sensing conditions, and transmitting the sensed conditions on the second communications medium to the controller by means of the first and second communications medium;
a third communications medium; and
a second sensor sensing a condition and transmitting the sensed condition on the third communications medium;
wherein the first sensor includes a receiver receiving communications on the third communications medium, and retransmitting communications from the third communications media on the second communications medium.

22. The system of claim 21 wherein the third communications medium is wireless.

23. The system of claim 21 wherein the first communications medium is a cable or a twisted wire pair or a power line carrier and the second communications medium is wireless.

24. The system of claim 21 wherein the third communications medium is infrared communications, ultrasonic communications, or radio frequency communications.

25. The system of claim 21 wherein the second communications medium is spread spectrum radio frequency communications.

26. The system of claim 25 wherein the third communications medium is spread spectrum radio frequency, and wherein the third communications medium operates either using a different frequency than the second communications medium, or using a different spreading algorithm than the second communications medium.

27. The system of claim 21 wherein the third communications medium is a fiber optic link, a cable link or a twisted wire pair link.

28. The system of claim 21 including an input connector operatively associated with the first sensor.

29. The system of claim 28 wherein the first sensor is portable and includes an internal power supply.

30. A building HVAC and automation system comprising:
means for conditioning air;
means, operably connected to the conditioning means, for distributing the conditioned air;
a first communications medium,
an automation system, operably connected to the conditioning means and the distributing means, controlling the distribution of conditioned air, the automation system including a plurality of controllers operably connected to the first communications medium;
a second wireless communications medium;
at least one central receiver operably connected to the first communications medium and including a first receiver receiving transmissions on the second communications medium and retransmitting the communications from the second communications medium onto the first communications medium;
a plurality of zone sensors, each zone sensor including a sensor sensing environmental conditions and a first transmitter transmitting data indicative of the sensed environmental conditions on the second communications medium;
wherein at least some of the plurality of controllers control the distribution of air in accordance with the transmitted data;
wherein at least a first controller of said plurality of controllers distributes air in accordance with the transmitted data received and combined from more than one of the plurality of zone sensors.

31. The system of claim 30 wherein at least some of the plurality of zone sensors include an input connector adapted to receive any of one of a plurality of sensors.

32. The system of claim 30 wherein the first controller averages the transmitted data from more than one of the plurality of zone sensors.

33. The system of claim 30 wherein the first controller distributes air in accordance with the transmitted data of a majority of the more than one of the plurality of zone sensors.

34. The system of claim 30 wherein each of the plurality of zone sensors includes means for entering a dormant state to conserve power, and means for awaking from the dormant state.

35. The system of claim 30 wherein the second communications medium is a radio frequency, an ultrasonic, an infrared, or a spread spectrum radio frequency medium.

36. The system of claim 35 wherein the first communications medium is a cable link, a twisted pair link, or a fiber optic link.

37. A method of controlling an environment comprising the steps of:
determining, with at least a first sensor, the environmental conditions in each of a plurality of zones;
transmitting signals indicative of the environmental conditions from each of said plurality of zones to a central receiver by means of a second communications medium;

receiving the environmental conditions at the central receiver from the second communications medium;

retransmitting the environmental conditions from the central receiver onto a first communications medium;

receiving in each of a plurality of controllers the retransmitted environmental conditions on the first communications medium; and controlling the environment of a particular zone in accordance with a predetermined portion of the environmental conditions from several sensors.

38. The method of claim 37 including the step of controlling the environment of the particular zone by averaging the environmental conditions from several sensors.

39. The method of claim 37 including the step of controlling the environment of the particular zone by prioritizing the environmental conditions from several sensors.

40. The method of claim 37 including the step of determining mode of operation of an air distribution based upon the environmental conditions of a majority of the plurality of zones.

41. The method of claim 37 including the step of providing an input connector in the first sensor where the input connector includes means for allowing an external sensor to be attached to the first sensor, the first sensor including means for recognizing the attachment of an external sensor to the input connector, identifying the type of external device attached to the input connector, and thereafter operating the external device in a conventional manner.

42. The method of claim 41 of the first sensor including the steps of attaching a second sensor to the input connector of the first sensor, measuring data using the second sensor, and forwarding that data to the respective controller by means of the second communications medium, the central receiver and the first communication medium.

43. A hierarchical control system comprising:

a first central receiver;

a first communications medium operably connecting the first central receiver to at least one controller;

a controller operably connected to the first central receiver by the first communications medium;

a first sensor sensing conditions;

a second communication medium;

a first transmitter transmitting the sensed conditions from the first sensor to the first central receiver via the second communications medium;

the first central receiver including a first receiver receiving transmissions on the second communications medium and retransmitting the transmissions on the first communications medium;

a third communications medium;

a second sensor sensing conditions, the second sensor including a second transmitter transmitting the sensed conditions on the third communications medium;

the first sensor including a second receiver receiving sensed conditions transmitted on the third communications medium, and retransmitting transmissions from the third communications medium on the second transmissions medium;

an input connector and means for identifying and processing data received from the input connector; and a setup tool providing programming instructions to the controller, and including a third transmitter transmitting the programming instructions on the second or third communications medium.

* * * * *